United States Patent
Möller et al.

(10) Patent No.: US 12,264,913 B2
(45) Date of Patent: Apr. 1, 2025

(54) METHOD AND DEVICE FOR MEASURING THE MECHANICAL ANGULAR POSITION OF A ROTOR

(71) Applicant: ELECTRICFIL AUTOMOTIVE, Beynost (FR)

(72) Inventors: Rainer Möller, Chaponnay (FR); Mathieu Le Ny, Villeurbanne (FR)

(73) Assignee: ELECTRICFIL AUTOMOTIVE, Beynost (FR)

( * ) Notice: Subject to any disclaimer, the term of this patent is extended or adjusted under 35 U.S.C. 154(b) by 127 days.

(21) Appl. No.: 17/998,704

(22) PCT Filed: May 10, 2021

(86) PCT No.: PCT/FR2021/050803
§ 371 (c)(1),
(2) Date: Nov. 14, 2022

(87) PCT Pub. No.: WO2021/229169
PCT Pub. Date: Nov. 18, 2021

(65) Prior Publication Data
US 2023/0288181 A1     Sep. 14, 2023

(30) Foreign Application Priority Data
May 14, 2020   (FR) ...................................... 2004789

(51) Int. Cl.
*G01B 7/30*       (2006.01)
*G01D 18/00*      (2006.01)
*G01R 33/07*      (2006.01)

(52) U.S. Cl.
CPC ..................... *G01B 7/30* (2013.01)

(58) Field of Classification Search
CPC ....... G01D 18/00; G01D 5/2053; G01R 33/07
See application file for complete search history.

(56) References Cited

U.S. PATENT DOCUMENTS

| | | | |
|---|---|---|---|
| 5,341,702 A * | 8/1994 | Chaney ................. | G01D 18/00 74/821 |
| 2013/0057263 A1* | 3/2013 | Hosek .................. | G01D 5/2266 324/207.18 |

(Continued)

FOREIGN PATENT DOCUMENTS

EP          2385353 A1     11/2011

OTHER PUBLICATIONS

International Search Report, dated Sep. 7, 2021, corresponding to International Application No. PCT/FR2021/050803.

*Primary Examiner* — Huy Q Phan
*Assistant Examiner* — Temilade S Rhodes-Vivour
(74) *Attorney, Agent, or Firm* — Ladas & Parry LLP; Malcolm J. MacDonald, Esq.

(57) ABSTRACT

The invention relates to a method and a device for measuring the mechanical angular position of a rotor including, during a calibration phase and then a setting phase:
  acquiring Ns measurement signals, at measurement locations offset by a corresponding mechanical angle, modulo $2\pi/Nc$ radians of angle, to $\pi/(2 \times Nc)$ radians for Ns=2 and $2\pi/3Nc$ radians for Ns=3;
  compute an instantaneous electrical angular position value taking into account the arctangent of the ratio of the values of the two measurement signals for the time under consideration, or the arctangent of the ratio of the values of the two transforms obtained by a Clarke transform, applied to three measurement signals;
  determine electrical calibration (SIGcb) and setting (Sigi) signatures;
  determine an angular measurement offset value by an operation of resetting the signatures.

24 Claims, 7 Drawing Sheets

(56) References Cited

U.S. PATENT DOCUMENTS

| | | | |
|---|---|---|---|
| 2016/0091342 A1* | 3/2016 | Liu | G01D 5/20 |
| | | | 324/207.25 |
| 2018/0138841 A1* | 5/2018 | Campbell | H02P 21/13 |
| 2019/0056251 A1 | 2/2019 | Elliott et al. | |
| 2021/0099112 A1 | 4/2021 | Long et al. | |

* cited by examiner

[Fig. 1]
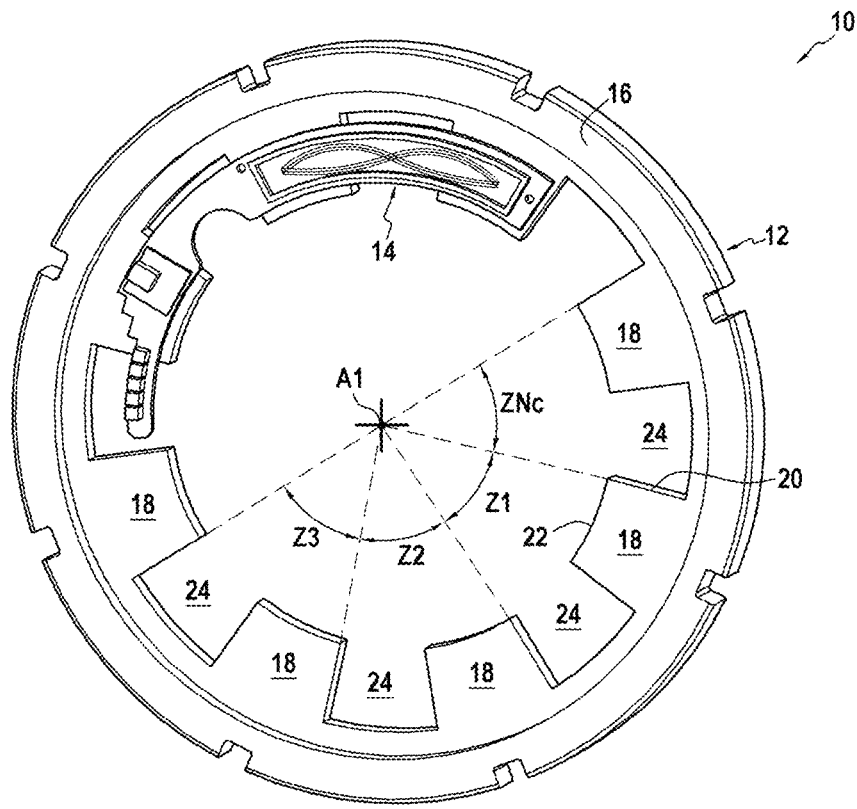
[Fig. 2]
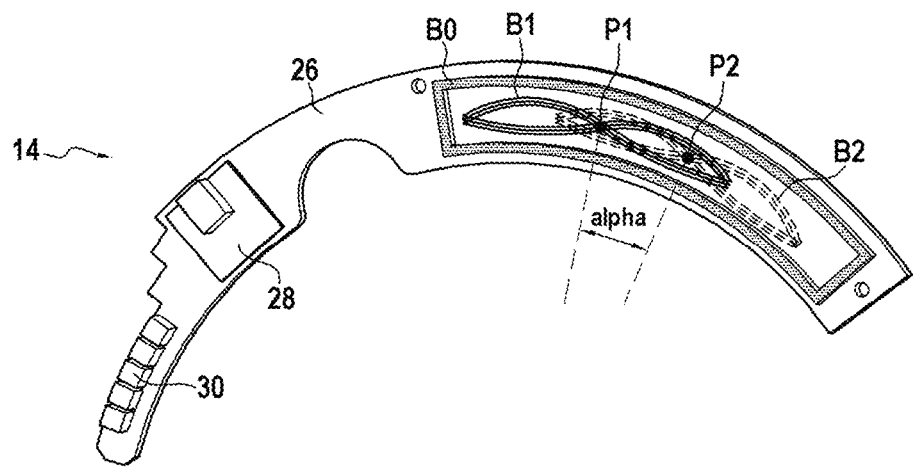

[Fig. 3]
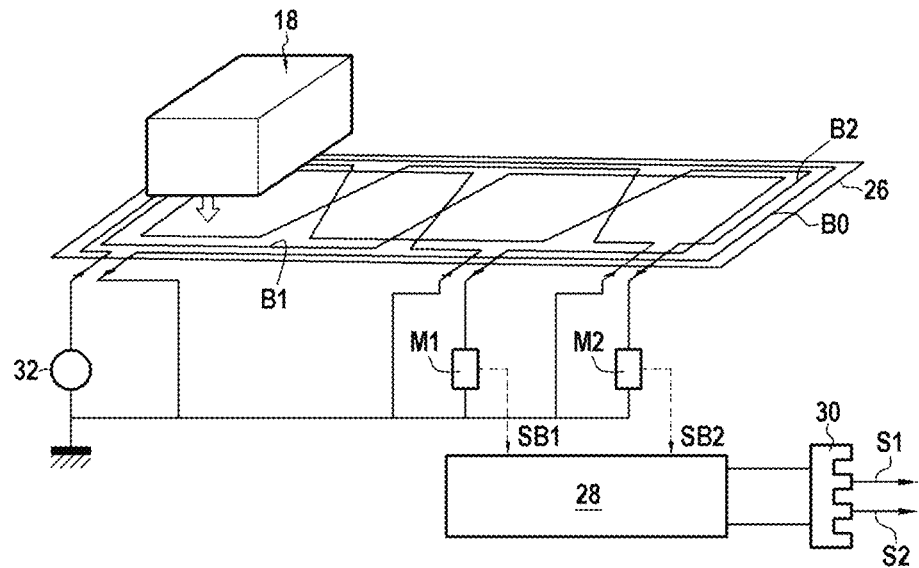
[Fig. 4]
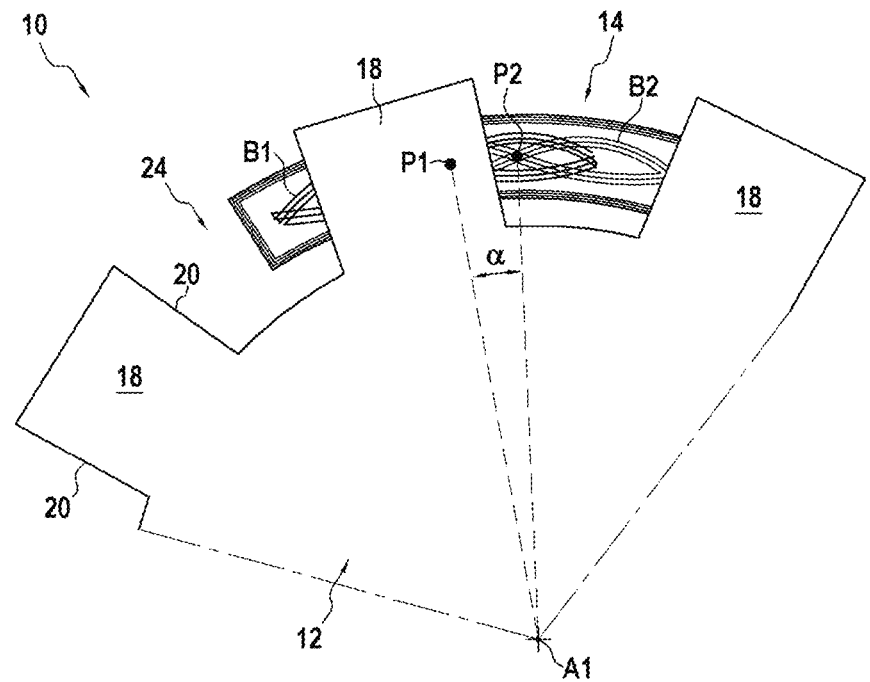

[Fig. 5]
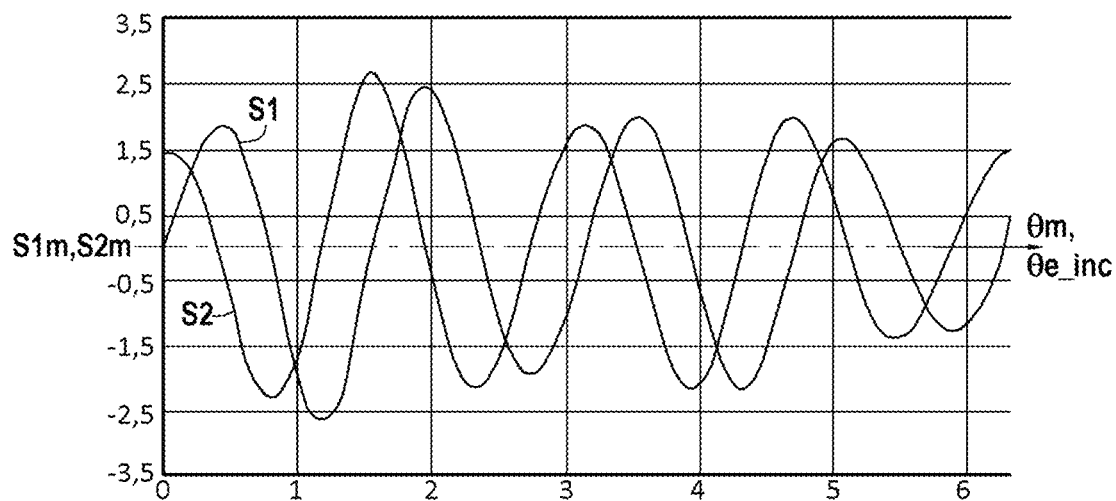
[Fig. 6]
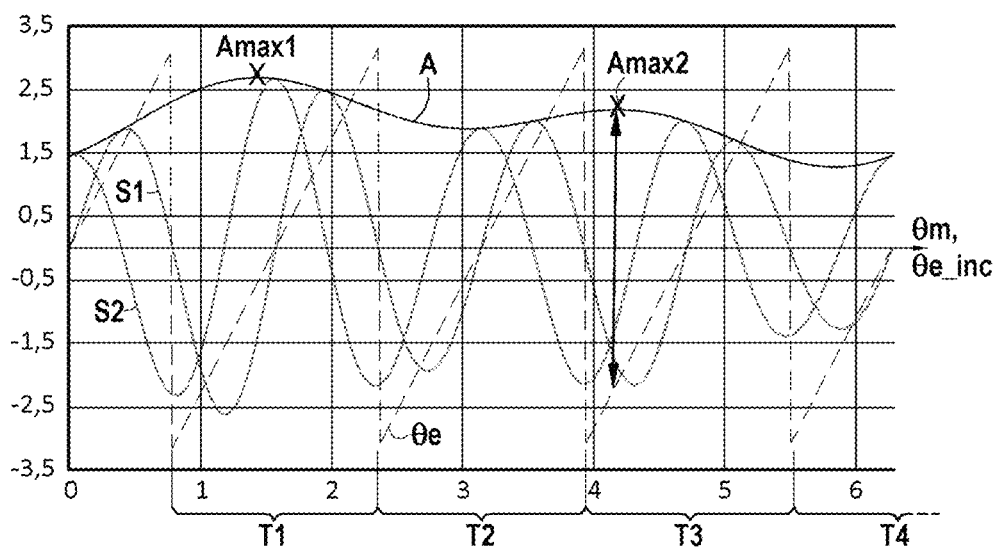

[Fig. 7]
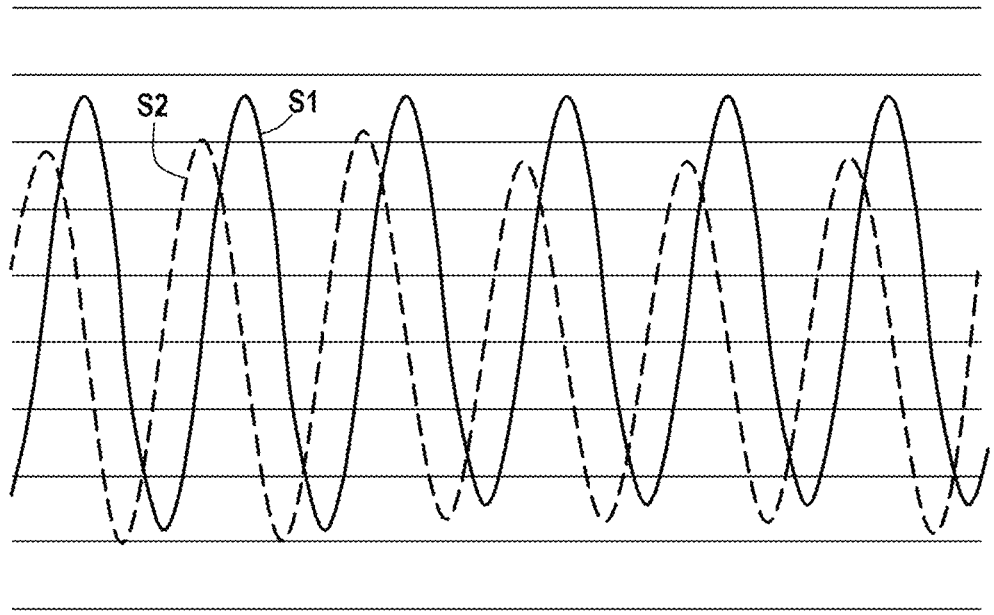
[Fig. 8]
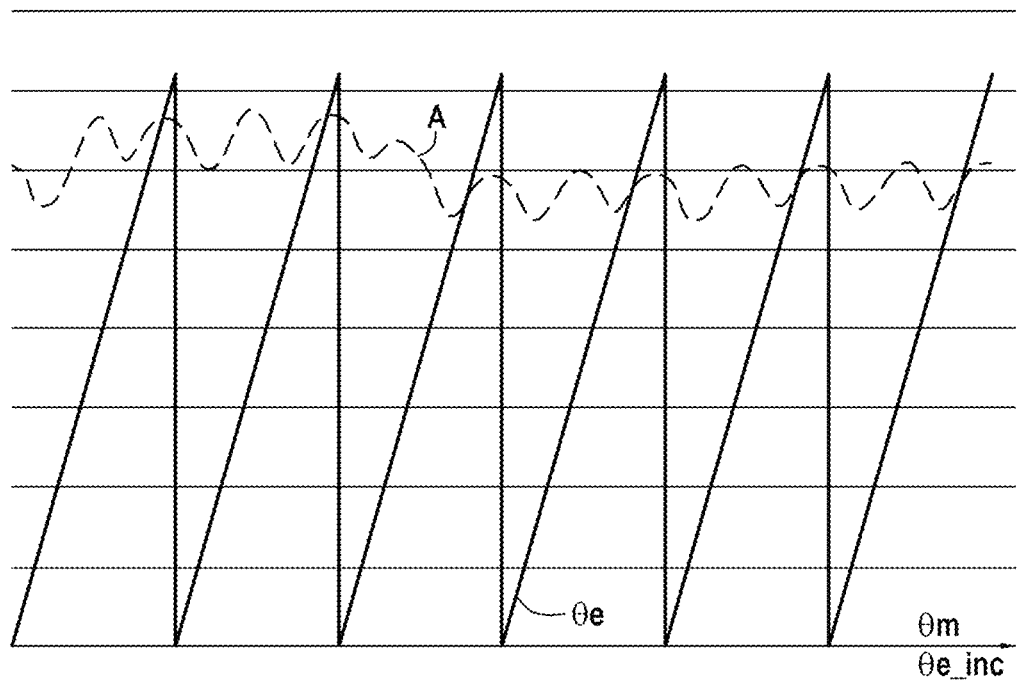

[Fig. 9]
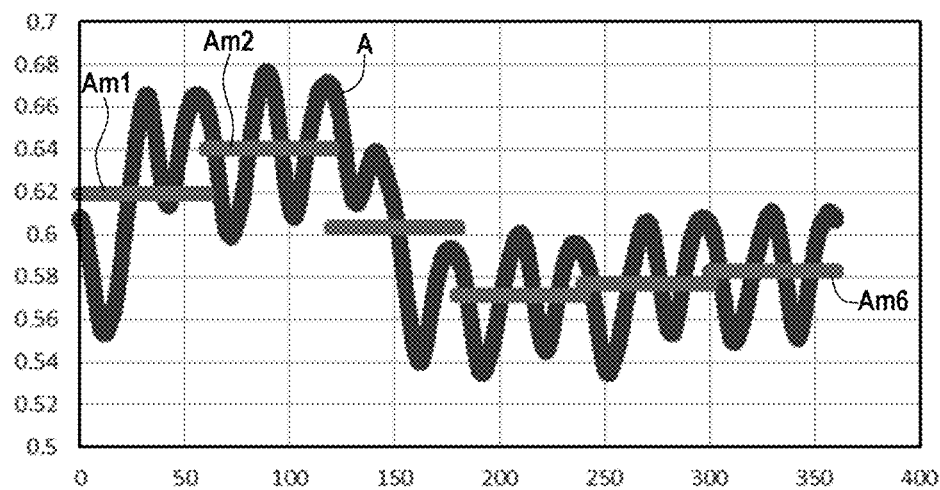
[Fig. 10]
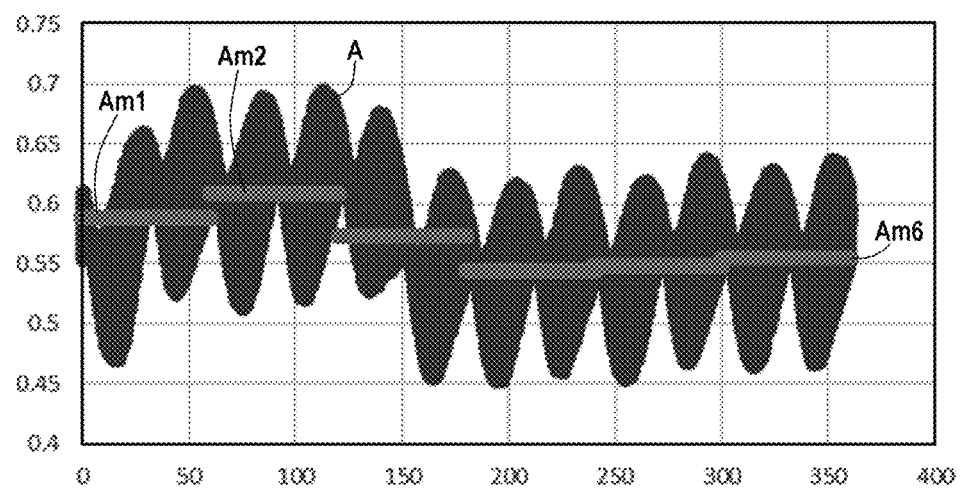

[Fig. 11]
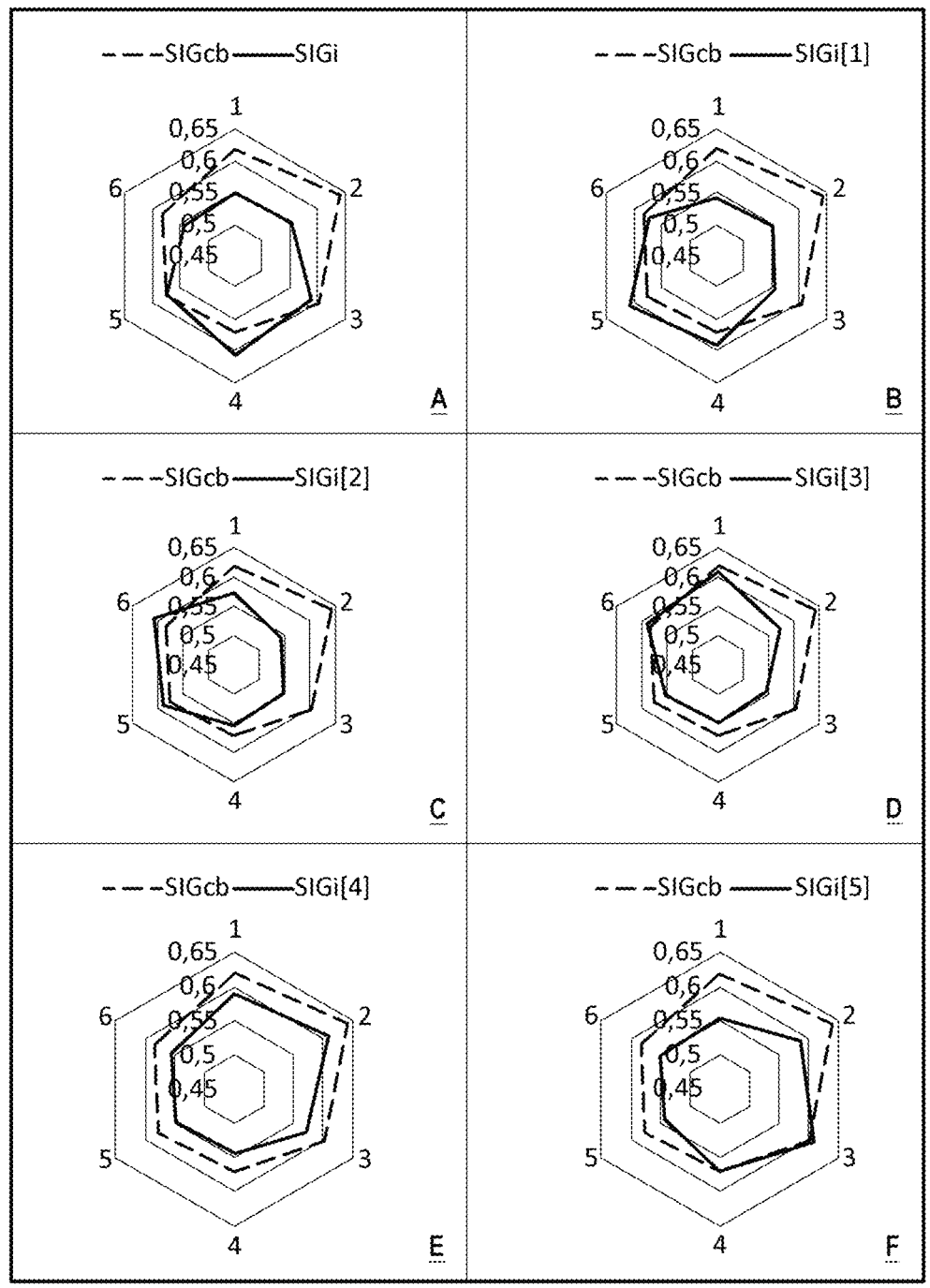

[Fig. 12]
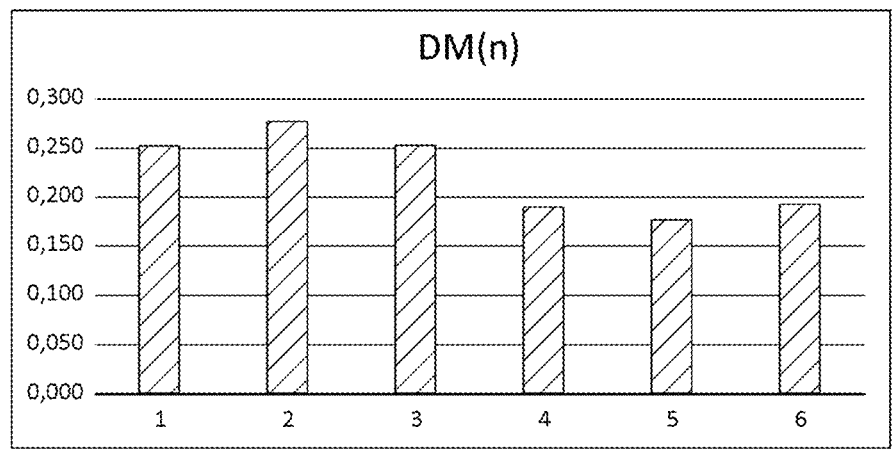
[Fig. 13]
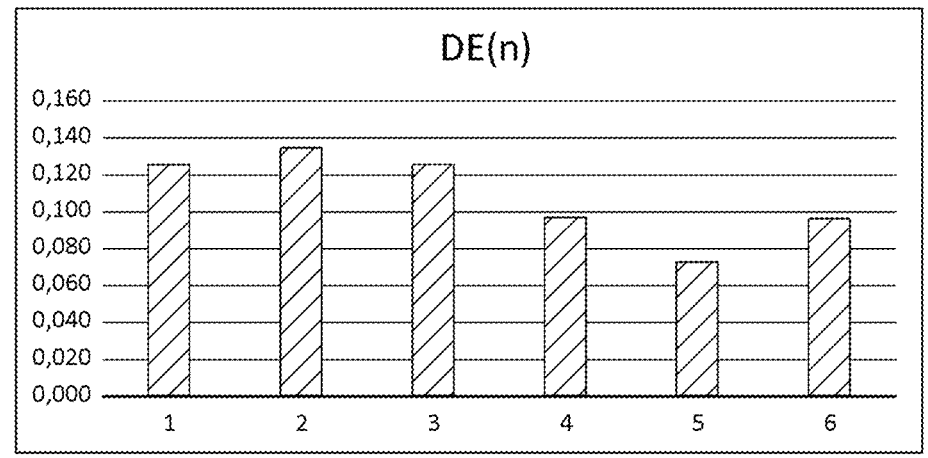

METHOD AND DEVICE FOR MEASURING THE MECHANICAL ANGULAR POSITION OF A ROTOR

TECHNICAL FIELD

The invention relates to the field of the measurement of the mechanical angular position of a rotor with respect to a stator in the case where the angular travel of the rotor with respect to the stator is greater than 360 degrees of angle, i.e. 2Pi radians of angle, about the axis of rotation of the rotor with respect to the stator.

This problem arises in many applications. One may for example wish to know the mechanical angular position of the rotor of an electric motor with respect to its stator. One may also wish to know the mechanical angular position of a crankshaft or a cam shaft of an internal combustion engine, the camshaft then being the rotor, or any rotary accessory of such a system, or else a drive screw of a screw-nut system.

PRIOR ART

To measure the mechanical angular position of a rotor with respect to a stator, many sensor systems are known comprising a detector and a target, the detector being capable of delivering a signal representative of the position of the target. According to a first family of technology, the target is a magnetic target and the detector includes one or more measuring cells capable of measuring the magnetic field, or the variation of the magnetic field, created by the target in the vicinity of the cell. According to another family of technology, the target is a metallic target and the detector includes induction means and means for measuring the variation of the induction incurred by the target or by its relative displacement with respect to the detector.

In all cases, such sensors are used by attaching the target to one or the other of the rotor or the stator, and by attaching the detector to the other one out of the rotor and the stator. It should be noted that, in the remainder of the text, it is considered, for the description of the exemplary embodiments, that the rotor is a part that is movable with respect to a general reference frame, and that the stator is a part that is fixed with respect to the same general reference frame. However, since it relates to a relative position measurement, which of the two is movable and which of the two is fixed has no importance. In this way, from the point of view of the scope of the invention, the rotor could be fixed with respect to a given reference frame, and the stator could then be movable with respect to this given reference frame. Or else, both the rotor and the stator could be movable with respect to a given reference frame.

Devices are known which, to measure the angular position, simultaneously and continuously acquire an integer number Ns of electrical measurement signals which are each representative of the intensity of an electrical or magnetic variable at one of a number Ns of measurement locations. The Ns measurement locations are separate and fixed with respect to the stator. They are offset by a given mechanical angle about the axis of rotation of the rotor with respect to the stator. Generally Ns is an integer equal to 2 or 3.

Generally, each measurement at each measurement location is taken by one or more measuring cells. To measure the electrical variable at two separate places, it is therefore necessary to have at least two measuring cells, each cell being able to include one or more measuring elements. In the case of measuring cells including several measuring elements, each cell being associated with a specific measurement location, two measuring cells corresponding to two specific measuring locations can share one or more measuring elements. However, for reasons of compactness, ease of assembly and integration of the sensor into the system comprising the rotor and the stator, it is advantageous that the number of measurement locations be reduced, and especially that the measurement locations are all contained in as limited an angular sector as possible about the axis of rotation of the rotor.

In these devices, the variation of the electrical measurement signal at a measurement location is caused by the rotation, in front of the measurement location under consideration, of a target mechanically linked to the rotor. To provide sufficient accuracy over an angular travel of 360 degrees of angle, i.e. 2Pi radians, and more, and also to allow the geographical containment of the separate measurement locations within a limited angular sector, which is favorable to the compactness of the sensor, the target has an integer number Nc, greater than or equal to 2, of separate contrast areas. Inside each of the contrast areas, the target has a contrast of electrical conductivity, magnetic permeability and/or magnetization. The term "contrast" should be understood to mean a variation in the electromagnetic characteristic of electrical conductivity, magnetic permeability and/or magnetization of the target as a function of the angular position in question of the target about the axis of rotation. This variation can be a binary variation, a continuous variation, a step variation etc. It is the presence of this contrast which will, when the contrast area passes in front of the detector, create the variation of a measurement signal as a function of the variation in the angular position of the target with respect to the measurement location.

The contrast areas Zk are angularly distributed across the target in a periodic pattern about the axis of rotation, this pattern having an integer number Nc of pattern periods. The pattern is considered as periodic in the sense that all the contrast areas have an equal angular extent about the axis of rotation and that each contrast area extends over a mechanical angle of 2Pi/Nc radians of angle about the axis of rotation. It is possible to identify each contrast area Zk by a rank k, integer, contained in the range going from 1 to Nc, and corresponding to the order of mechanical angular position of the contrast area with respect to the other contrast areas about the axis of rotation. The rank k therefore corresponds to the physical arrangement of the contrast areas on the target. Thus, when the target passes in front of a location under consideration, one sees pass the contrast area of rank 1, then that of rank 2, then that of rank 3 and so on down to that of rank Nc, which will be followed, after 2Pi radians of mechanical angular position of the rotor, once again by the contrast area of rank 1. Of course, if the rotor is rotating in the opposite direction, the order of passing will also be reversed. Finally, as it will be understood below, at the start of a measuring session, it is not mandatory for the first contrast area to be seen by the detector to necessarily be that of rank 1.

In some devices, each contrast area Zk is such that the passing, in rotation about the axis of rotation, of a contrast area of the target in front of each measurement location leads to a variation in the electrical measurement signal acquired at this location which is a sinusoidal or quasi-sinusoidal function of an electrical angular position θe of the contrast area with respect to the measurement location. The electrical angular position θe, as it can be calculated via the acquired signals, may for example be expressed in radians and therefore varies by 2Pi radians for a variation of 2Pi/Nc radians of angle of the mechanical angular position θm of the target about the axis of rotation. The number Nc of contrast areas Zk creates, over one mechanical turn of the stator, the same number Nc of sinusoidal or quasi-sinusoidal periods of the measurement signal $S1(\theta e)$, $S2(\theta e)$ as the number Nc of contrast areas.

Based on such devices, and by exploiting the sinusoidal or quasi-sinusoidal nature of the signals in accordance with the relative angular position of the rotor with respect to the stator, it is easy to determine the electrical angular position $\theta e$ of the rotor with respect to the stator with sufficient accuracy inside the angular extent of a contrast area, and therefore within a period or quasi-period of the signals. However, for devices in which the target has two or more periodic contrast areas, it is not possible to know a mechanical angular position $\theta m$ over the 2Pi radians of mechanical angle of the rotor with respect to the stator. Indeed, due to the periodic nature of the contrast areas, there is a number Nc of mechanical angular positions $\theta m$ of the rotor the same as the number Nc of contrast areas, in which the electrical angular position $\theta e$ that can be calculated on the basis of the acquired signals is equal. Indeed, the periodic nature of the contrast areas means that there are Nc locations of the target which generate, in front of the detector, the same electromagnetic conditions.

The document US 2019/056251 describes a device in which the measured angular position is corrected to compensate for a non-sinusoidal signal caused by geometrical errors. The correction is based on a scale factor, using a lookup table with predetermined data from tests and simulations.

The document WO 2020/006659 describes a method that enables to obtain an accurate absolute position measurement owing to the use of an absolute but non-accurate initial measurement and an accurate but non-absolute measurement.

Such sensors can be perfectly satisfactory if one is only interested in the variation in angular position of the rotor, for example the angular speed of the rotor, or else when the system which is associated with the rotor and with the stator is itself also entirely periodical, with the same number of periods as the number Nc of contrast areas of the target.

However, it is sometimes necessary to know the mechanical angular position of the rotor with respect to the stator, i.e. to obtain a bijective relationship, between the value representative of the position which is delivered by the sensor and the actual angular position, over 2Pi radians of mechanical angle, of the rotor with respect to the stator. By comparison, the electrical angular position $\theta e$ as defined above only makes it possible to establish a bijective relationship, between the value representative of the position which is delivered by the sensor and the actual angular position, over an angular sector, the angular dimension of which is equal to the angular extent of one contrast area.

To achieve this, the document EP-2.385.353 describes a sensor which implements some of the above features. This sensor belongs to the technologic family of magnetic sensors in which the target includes magnetic elements and the detector in this case includes two cells for measuring the magnetic field, for example Hall effect cells. This sensor therefore has a target which is provided with contrast areas. In the example described in this document, a contrast area is formed by two juxtaposed elementary magnets, one of which presents its north pole in the direction of the measuring cells, while the other presents its south pole. The difference in orientation of the elementary magnets of one and the same contrast area therefore creates the contrast within the meaning of the invention. All the contrast areas formed of two juxtaposed elementary magnets have the same angular extent around the rotor, which in the example of this document is of an angle of 20°. However, this document makes provision for each contrast area to differ from its neighbor by a different ratio of the respective angular extents of these two elementary magnets. For certain contrast areas, the ratio seems to be approximately one to one, while for other areas, the ratio seems to be approximately one to four or even one to five. However, it is understood that, inside one and the same contrast area, a first elementary magnet, when it passes in front of a measuring cell, will create a signal that can be described as mainly positive, while the second elementary magnet, when it passes in front of the same measuring cell, will create a signal that can be described as mainly negative. Thus, the measured physical variable, here the magnetic field, will exhibit a first positive half-alternation and a second negative half-alternation, with the peculiarity, in the case of the device described in this document, that the width of each half-alternation varies from one contrast area to another, even if the sum of the durations of the two half-alternations of one and the same contrast area is constant for all contrast areas. In other terms, the signal generated by a given contrast area exhibits two half-alternations which, for certain contrast areas, have separate durations in a ratio which can be up to one to four or one to five.

In this document EP-2.385.353, the detector includes two measuring cells which are spaced apart from one another by 10 degrees of mechanical angle, which corresponds to half the angular extent of one contrast area. This document appears to state that the sum of the signals recorded by the two measuring cells varies according to a variation law which, if the variation in the ratio of the angular extents of the elementary magnets of the successive contrast areas is properly chosen, varies as a sinusoidal function over the 2Pi radians of mechanical angle about the axis of the rotor. This is what appears to be shown by the curve bearing the reference number 22 in FIG. 2 of this document.

The device described in this document is however particularly complex and expensive to produce insofar as it is necessary to create elementary magnets of different sizes for each contrast area and to assemble them in a strict order.

The invention thus has the objective of creating a measuring method which is particularly simple to implement with devices of conventional construction, to measure the mechanical angular position over 2Pi radians of angle of a rotor with respect to a stator.

SUMMARY OF THE INVENTION

The invention relates to a method for measuring the mechanical angular position of a rotor, the rotor being movable in multi-turn rotation about an axis of rotation with respect to a stator, of the type in which:

In this method, one acquires a number Ns of electrical measurement signals each representative of the intensity of an electrical or magnetic variable at one of a number Ns of measurement locations, the Ns measurement locations being separate, fixed with respect to the stator and offset by a given mechanical angle about the axis of rotation, Ns being an integer equal to 2 or 3.

The variation in the electrical measurement signal at a measurement location is caused by the rotation, in front of the measurement location under consideration, of a target mechanically linked to the rotor and having a number Nc, greater than or equal to 2, of separate contrast areas of the target, in which the target includes a contrast in electrical conductivity, magnetic permeability and/or magnetization.

The contrast areas are angularly distributed across the target in a periodic pattern about the axis of rotation, the pattern having Nc pattern quasi-periods, each contrast area extending over a mechanical angle 2Pi/Nc about the axis of rotation.

Each contrast area is such that the passing, in rotation about the axis of rotation, of a contrast area in front of each measurement location leads to a variation in the electrical measurement signal acquired at this location which is a quasi-sinusoidal function of an electrical angular position of the contrast area with respect to the measurement location, the electrical angular position varying by 2Pi radians for a 2Pi/Nc radians variation in the mechanical angular position of the target about the axis of rotation.

At least two of the contrast areas have a physical difference between one another which creates, between at least two separate quasi-periods of the measurement signal, over one and the same turn of the target, a difference in the amplitude of the intensity of the physical variable measured in said at least two separate quasi-periods of the measurement signal respectively.

The measurement locations are offset about the axis of rotation by a corresponding mechanical angle, modulo 2Pi/Nc radians of angle, to Pi/(2×Nc) radians for Ns=2 and 2Pi/3Nc radians for Ns=3.

The method includes, during a calibration phase, then again during a setting phase of a measurement session:
a) acquiring, over one mechanical turn of the target about the axis of rotation, the Ns electrical measurement signals,
b) computing, for different mechanical angular positions over one mechanical turn of the target about the axis of rotation, an instantaneous value of the electrical angular position for the mechanical angular position under consideration, by a law of calculation of the electrical angular position taking into account:
for Ns=2, the arctangent of the ratio of the values of the two measurement signals for the time under consideration, or
for Ns=3, the arctangent of the ratio of the values of the two transforms obtained by a Clarke transform, applied to the three measurement signals for the time under consideration;
c) computing an instantaneous incremented electrical angular position value, obtained by incrementing a counter X by one unit for any 2PI radians variation in the electrical angular position, this variation occurring in the same direction of rotation;
d) determining by computer at least one electrical signature of the target, comprising an electrical calibration signature determined during the calibration phase and an electrical setting signature determined during the setting phase, each electrical signature being determined by a pair of signature values or a series of pairs of signature values, a pair of signature values comprising:
a magnitude signature value, derived from at least one of the values of at least one of the measurement signals for at least one angular position of the target;
and an angular position signature value for the angular position or positions of the target corresponding to the instantaneous magnitude value or values that were taken into account to determine the magnitude signature value.

During the calibration phase, the electrical calibration signature of the target is recorded by computer.

During the setting phase of a measurement session, one determines an angular offset measurement value by a resetting operation comprising the calculation of the angular measurement offset value, which, applied to the angular position signature values of the electrical setting signature or of the electrical calibration signature, makes it possible to minimize the difference between the electrical setting signature and the electrical calibration signature.

During the measurement session, one determines the mechanical angular position of the rotor at a given time by correcting the incremented electrical angular position by an amount equal to the angular measurement offset value.

Other features of such a method, optional and able to be implemented individually or in combination, are indicated hereinafter.

The instantaneous incremented electrical angular position value can be obtained according to the relationship $\theta e\_inc=mod((\theta e+X\times 2Pi)/Nc, 2Pi)$, in which case one can determine the mechanical angular position of the rotor at a given time as being, modulo 2Pi, the incremented electrical angular position value corrected by an amount equal to the angular measurement offset value.

In a variant, the instantaneous incremented electrical angular position can be obtained according to the relationship $\theta e\_inc=mod((\theta e+X\times 2Pi), Nc\times 2Pi)$, in which case one can determine the mechanical angular position of the rotor at a given time as being, modulo 2Pi, the incremented electrical angular position, divided by the number of contrast areas and corrected by an amount equal to the angular measurement offset value.

The determination of a pair of signature values of an electrical signature may comprise:
i) computing, at each angular position over one mechanical turn of the rotor about the axis of rotation:
an instantaneous magnitude value representative of the intensity of the physical variable for the angular position, by a law of calculation of the instantaneous magnitude values taking into account the value of at least one of the two measurement signals for the time under consideration,
an instantaneous electrical angular position value, by the law of calculation of the instantaneous electrical angular position values;
ii) recording by computer the pair of signature values comprising, according to a rule of determination of signature values:
the magnitude signature value, derived from at least one of the instantaneous magnitude values;
and the incremented electrical angular position signature value derived from the instantaneous electrical angular position values for the angular position or positions, the instantaneous magnitude value or values of which were taken into account to derive the magnitude signature value.

The electrical signature of the target may comprise at least one pair of signature values having a magnitude signature value, the value of which is unique over one mechanical turn.

The electrical signature of the target may comprise at least one pair of signature values having a magnitude signature value, the value of which exhibits the greatest difference from all the other instantaneous magnitude values corresponding to the same instantaneous value of the electrical angle over one mechanical turn.

The electrical signature of the target may comprise an ordered series of pairs of signature values, each pair of signature values corresponding to one contrast area.

The series of pairs of signature values is ordered according to the order in which the corresponding contrast areas pass in front of each measurement location.

The rule of determination of signature values may take into account, for a given angular position, at least one value from among:
- the sum of the squares of the measurement signal values for this angular position, each measurement signal value being able to be reduced by an offset value of this signal, or the square root of this sum;
- a linear combination of the squares of the measurement signal values for this angular position, each measurement signal value being able to be reduced by an offset value of this signal, or the square root of this linear combination;
- a linear combination of the absolute measurement signal values for this angular position, each measurement signal value being able to be reduced by an offset value of this signal;
- the sum or a linear combination of the measurement signal values for this angular position, each measurement signal value being able to be reduced by an offset value of this signal.

The rule of determination of signature values may take into account, for an angular range, for example one sinusoidal quasi-period of a measurement signal, at least one value from among:
- a maximum value of the absolute value of one or more of the measurement signals over this angular range, each measurement signal value being able to be reduced by an offset value of this signal;
- a mean value of one or more measurement signals over this angular range, each measurement signal value being able to be reduced by an offset value of this signal.

The rule of determination of signature values may take into account, for an angular range, for example one sinusoidal quasi-period of a measurement signal, at least one value from among:
- a mean value, over this angular range, of the square root of the sum of the squares of the measurement signal values, each measurement signal value being able to be reduced by an offset value of this signal;
- a mean value, over this angular range, of the square root of a linear combination of the squares of the measurement signal values, each measurement signal value being able to be reduced by an offset value of this signal;
- a mean value, over this angular range, of a linear combination of the absolute measurement signal values, each measurement signal value being able to be reduced by an offset value of this signal.

The rule of determination of signature values may determine at least one pair of signature values corresponding to an identifiable value from among the pairs of values formed by an instantaneous magnitude value and by the corresponding incremented electrical angular position.

The identifiable value can be an instantaneous magnitude value which takes one from among the following values: local maximum, local maximum over one quasi-period of the electrical angular position, local minimum, local minimum over one quasi-period of the electrical angular position, absolute maximum over one mechanical turn of the target, absolute maximum over one quasi-period of the electrical angular position, absolute minimum over one mechanical turn of the target, absolute minimum over one quasi-period of the electrical angular position, previously determined value, mean value over one mechanical turn of the target, mean value over one quasi-period of the electrical angular position, and mean value over one half-period of the electrical angular position.

The identifiable value can be an electrical angular position or an incremented electrical angular position.

The rule of determination of signature values can determine at least one pair of signature values corresponding to one or more predefined value(s) of electrical angular position and/or to a predefined series of incremented electrical angular positions.

Starting from an electrical calibration signature having M pairs of reference values and able to be written as $$SIGcb=\{(Asigcb1;\theta e\_inc\_sigcb1);(Asigcb2; \theta e\_inc\_sigcb2),\ldots,(Asigcb_M;\theta e\_inc\_sigcb_M)\}$$

and an electrical setting signature, written as $$SIGi=\{(Asigi1;\theta e\_inc\_sigi1);(Asigi2;\theta e\_inc\_sigi2-),\ldots,(Asigi_M;\theta e\_inc\_sigi_M)\},$$

it is possible to compute the value "$n_{min}$" of the number of circular permutations to be applied to the ordered vector of magnitude signature values $Asigi=\{Asigi_1; Asigi_2; \ldots; Asigi_M\}$ extracted from the electrical setting signature SIGi, for which the difference between the circularly permutated ordered vector is:

$$Asigi[n]=\{Asigi_{1+n,\ within\ the\ range\ [1,M]}; Asigi_{2+n,\ within\ the\ range\ [1,M]}; \ldots; Asigi_{M+n,\ within\ the\ range\ [1,M]}\}$$

and the ordered vector of magnitude signature values Asigcb $\{Asigcb_1; Asigcb_2; \ldots; Asigcb_M\}$, extracted from the electrical calibration signature SIGcb, is minimal, and one can compute the value of this angular measurement offset from the difference, for at least one value of j:

$$delta\_i\_\theta m0=\theta e\_inc\_sigi_{j+nmin,\ within\ the\ range\ [1,M]}-\theta e\_inc\_sigcb_j.$$

The physical difference between two of the contrast areas can be a voluntary difference in design of a sensor comprising the target and the means for acquiring the Ns electrical measurement signals.

The physical difference between two of the contrast areas can be an involuntary difference related to manufacturing or installation dispersions of a sensor comprising the target and the means for acquiring the Ns electrical measurement signals.

The invention also relates to a device for measuring the mechanical angular position of a rotor, the rotor being movable in multi-turn rotation about an axis of rotation with respect to a stator, including:
- a detector that acquires a number Ns of electrical measurement signals each representative of the intensity of an electrical or magnetic variable at one of a number Ns of measurement locations, the Ns measurement locations being separate, fixed with respect to the stator and offset by a given mechanical angle about the axis of rotation, Ns being an integer equal to 2 or 3;
- a target (12) mechanically linked to the rotor and having a number Nc, greater than or equal to 2, of separate contrast areas (Zk) of the target, in which the target includes a contrast in electrical conductivity, magnetic permeability and/or magnetization.

The contrast areas are angularly distributed across the target in a periodic pattern about the axis of rotation, the pattern having Nc pattern quasi-periods, each contrast area extending over a mechanical angle of 2Pi/Nc about the axis of rotation.

Each contrast area is such that the passing, in rotation about the axis of rotation, of a contrast area of the target in front of each measurement location induces a variation in the electrical measurement signal acquired at this location which is a quasi-sinusoidal function of an electrical angular position of the contrast area with respect to the measurement location, the electrical angular position varying by 2Pi radians for a 2Pi/Nc radians variation in the mechanical angular position of the target about the axis of rotation;

At least two of the contrast areas have a physical difference between one another which creates, between at least two separate quasi-periods of the measurement signal over one and the same turn of the target, a difference in the amplitude of the intensity of the physical variable measured in said at least two separate quasi-periods of the measurement signal respectively;

In the device, the measurement locations are offset about the axis of rotation by a corresponding mechanical angle (alpha), modulo 2Pi/Nc radians of angle, to Pi/(2×Nc) radians for Ns=2 and 2Pi/3Nc radians for Ns=3.

In addition, the device includes an electronic control unit (28) programmed to:
a) acquire, over one mechanical turn of the target about the axis of rotation, the Ns electrical measurement signals (S1, S2),
b) compute, for different mechanical angular positions over one mechanical turn of the target about the axis of rotation, an instantaneous value of the electrical angular position (θe) for the mechanical angular position under consideration, by a law of calculation of the electrical angular position taking into account:
for Ns=2, the arctangent of the ratio of the values of the two measurement signals (S1, S2) for the time under consideration, or
for Ns=3, the arctangent of the ratio of the values of the two transforms obtained by a Clarke transform, applied to the three measurement signals for the time under consideration;
c) compute an instantaneous incremented electrical angular position value, obtained by incrementing a counter X by one unit for any 2PI radians variation in the electrical angular position, this variation occurring in the same direction of rotation;
d) determine by computer at least one electrical signature of the target, each electrical signature being determined by a pair of signature values or a series of pairs of signature values, a pair of signature values comprising:
a magnitude signature value, derived from at least one of the values of at least one of the measurement signals for at least one angular position of the target;
and an angular position signature value for the angular position or positions of the target corresponding to the instantaneous magnitude value or values that were taken into account to determine the magnitude signature value.

The device includes an electronic memory in which is recorded by computer an electrical calibration signature of the target determined during a calibration phase.

The electronic control unit is programmed to, during a setting phase of a measurement session, determine an electrical setting signature and an angular measurement offset value by a resetting operation comprising the calculation of the angular measurement offset value which, applied to the angular position signature values of the electrical setting signature or of the electrical calibration signature, makes it possible to minimize the difference between the electrical setting signature and the electrical calibration signature.

In addition, during the measurement session, the electronic control unit determines the mechanical angular position of the rotor at a given time by correcting the incremented electrical angular position by an amount equal to the angular measurement offset value.

Other features of such a device, optional and able to be implemented individually or in combination, are indicated hereinafter.

The electronic control unit can be programmed to, during a calibration phase:
a) acquire, over one mechanical turn of the target about the axis of rotation, the Ns electrical measurement signals,
b) compute, for different mechanical angular positions over one mechanical turn of the target about the axis of rotation, an instantaneous value of the electrical angular position for the mechanical angular position under consideration, by a law of calculation of the electrical angular position taking into account:
for Ns=2, the arctangent of the ratio of the values of the two measurement signals (S1, S2) for the time under consideration, or
for Ns=3, the arctangent of the ratio of the values of the two transforms obtained by a Clarke transform, applied to the three measurement signals for the time under consideration;
c) compute an instantaneous incremented electrical angular position value, obtained by incrementing a counter X by one unit for any 2PI radians variation in the electrical angular position, this variation occurring in the same direction of rotation;
d) determine by computer at least one electrical calibration signature of the target, determined by a pair of signature values or a series of pairs of signature values, a pair of signature values comprising:
a magnitude signature value, derived from at least one of the values of at least one of the measurement signals for at least one angular position of the target;
and an angular position signature value for the angular position or positions of the target corresponding to the instantaneous magnitude value or values that were taken into account to determine the magnitude signature value.

The physical difference between two of the contrast areas can be a voluntary difference in design of the target.

The physical difference between two of the contrast areas can be an involuntary difference related to manufacturing or installation dispersions of a sensor comprising the target and the detector.

The electronic control unit can be programmed to implement a method as described above.

The detector can be produced in the form of a detector box, comprising a box, preferably sealed, in which are arranged measuring cells, the electronic control unit and a computerized communication interface.

BRIEF DESCRIPTION OF THE DRAWINGS

FIG. 1 is a schematic view of an example of a sensor making it possible to implement the invention.

FIG. 2 is a schematic view of the detector of the sensor of FIG. 1.

FIG. 3 is a schematic view illustrating the operating principle of a sensor of the type of FIG. 1.

FIG. 4 is a schematic view illustrating, in a variant embodiment, the operating principle of a sensor of the type of those of FIGS. 1 to 3.

FIG. 5 is a graph illustrating the measurement signals acquired during one mechanical turn with a sensor with 4 contrast areas.

FIG. 6 is a graph illustrating the electrical angular position and the result of an example of a law of calculation of an instantaneous magnitude value, representative of the intensity of the physical variable for the angular position under consideration, on the basis of the measurement signals illustrated in FIG. 5.

FIG. 7 is a graph illustrating the measurement signals acquired during one mechanical turn with a sensor with 6 contrast areas.

FIG. 8 is a graph illustrating the electrical angular position and the result of an example of a law of calculation of an instantaneous magnitude value, representative of the intensity of the physical variable for the angular position under consideration, on the basis of the measurement signals illustrated in FIG. 7.

FIG. 9 is a graph illustrating the variation in the function used as law of calculation of the instantaneous magnitude value, over one full mechanical turn of the target, and a mean value of this instantaneous magnitude value over each quasi-period.

FIG. 10 is a graph illustrating the variation in the function used as law of calculation of the instantaneous magnitude value, over one full mechanical turn of the target, with the addition of a noise function on the measurement signals, and a mean value of this instantaneous magnitude value over each quasi-period.

FIG. 11 illustrates, in the form of 6 radar diagrams, the electrical calibration signature and the electrical setting signature for a sensor of the same type as those for which the measurement signals and their derivatives are illustrated in FIGS. 7 to 10. In each diagram, the electrical calibration signature is illustrated in the form of a closed dotted-line curve and the electrical setting signature is illustrated in the form of a closed solid-line curve. The apices of the closed curve represent the pairs of signature values, in polar coordinates. The diagram A illustrates the two diagrams as resulting from the measurements. The diagrams B to F each correspond to a value of the number of circular permutation increments of the ordered vector of the pairs of signature values of the electrical setting signature.

FIG. 12 is a diagram, illustrating, for each of the "n" values of the number of circular permutation increments of the ordered vector of the pairs of signature values of the electrical setting signature, the "Manhattan distance" between the ordered vectors representing the electrical calibration and setting signatures.

FIG. 13 is a diagram similar to that in FIG. 12, illustrating, for each of the "n" values of the number of circular permutation increments of the ordered vector of the pairs of signature values of the electrical setting signature, the "Euclidian distance" (FIG. 13) between the ordered vectors representing the electrical calibration and setting signatures.

DESCRIPTION OF THE EMBODIMENTS

FIG. 1 schematically represents an exemplary embodiment of a sensor 10 making it possible to implement a measuring method according to the invention. This sensor 10 includes a target 12 and a detector 14. The detector is shown alone in FIG. 2.

In this example, the sensor 10 is an inductive-type sensor in which the detector 14 is able to create an electromagnetic field and to measure a value representative of an electric field. The target 12 has electromagnetic properties which allow it, when it passes in front of the detector 14, to modify the properties of the electromagnetic field such that this modification is detected by the detector 14. For example, the target includes metallic elements in which the electromagnetic field created by the detector 14 induces eddy currents, these eddy currents then in turn perturbing the electromagnetic field, which can be detected by the detector 14. Note however that the invention can also be implemented with a magnetic technology sensor.

In all cases, the sensor 10 is intended to be used to measure the mechanical angular position of two parts which are rotationally movable with respect to one another about an axis of rotation A1. The sensor 10 is able to measure and indicate the angular position over 360 degrees of mechanical angle, for an angular travel of the rotor with respect to the stator which exceeds one mechanical turn, and therefore for an angular travel which exceeds 360 of mechanical angle, and therefore exceeds 2Pi radians of mechanical angle. For an angular travel which exceeds one mechanical turn, the sensor 10 does not necessarily give an indication of the number of rotations travelled, but is able, even after several mechanical turns, to give the relative angular position of the rotor and the stator over 360 degrees of mechanical angle. The target 12 is intended to be attached to one of these parts which will here arbitrarily be referred to as the rotor. The detector 14 is intended to be attached to the other of the parts, here arbitrarily referred to as the stator. In practice, it will often be easier to attach the detector 14 to a fixed part, thereby justifying its name of stator, since the detector 14 is made to exchange information, particularly electrical measurement signals, with a wider system into which the sensor can be integrated, for example an electronic control system of an electric motor comprising the rotor and the stator. Contrariwise, the target 12 is generally a passive element not requiring any electrical connection, such that its mounting on a turning part does not pose any particular problem. However, nothing prevents the detector 14 from being mounted on a turning part and the target 12 being mounted on a fixed part, or else the detector 14 and the target 12 being each mounted on a part, the two parts being rotary with respect to one another and being both rotary with respect to a fixed environment.

The target 12 has a number Nc, greater than or equal to 2, of separate contrast areas. These contrast areas Zk, with k=1, 2, . . . , Nc, are angularly distributed across the target in a periodic pattern about the axis of rotation A1. Typically, the number Nc of separate contrast areas is greater than or equal to 4. The invention will be particularly beneficial for cases where the target has an integer number Nc less than or equal to 20, of separate contrast areas.

As a first approximation, the contrast areas are identical with one another and it can be considered that the contrast areas follow one another without any discontinuity between the contrast areas over the 360 degrees of mechanical angle about the axis of rotation of the target 12, to form a continuous periodic pattern, the repeating pattern elements of which are the contrast areas that follow one another. However, in detail, it will be seen that the invention makes use of the fact that a real sensor is not an ideal sensor, and that it will of necessity include at least two of the contrast areas Zk that have a physical difference between one another.

In the illustrated example, the target 12 comprises radial teeth 18 borne by a support 16. In the example of FIG. 1, the support 16 takes the form of an angular ring about an axis A1, and the radial teeth 18 extend radially inward from the annular ring 16. It will however be seen with reference to FIG. 4 that provision could be made for a target comprising radial teeth 18 extending radially outward from a central support 17 which can be annular or not.

In the example of FIG. 1, the radial teeth 18 are angularly delimited by lateral edges 20 which are straight and which are each oriented along the direction of a radius from the axis A1 and passing through this edge. However, the teeth could have a different geometry, in particular not including any lateral edges 20 that are either straight or each oriented in the direction of a radius coming from the axis A1.

In the example of FIG. 1, the radial teeth 18 are radially delimited inward by a radial extremity edge 22 in the shape of a semi-circle centered on the axis A1 and delimited by the two lateral edges 20. The radial teeth 18 are angularly spaced evenly about the axis A1.

In theory, the radial teeth 18 are considered as being identical, with any differences being due to manufacturing tolerances, or uncontrolled deformations. In this context, the radial teeth 18 are considered as all having the same angular dimension about the axis A1.

Similarly, the radial teeth 18 are considered as being arranged at a same radial distance from the axis A1, and they also have the same radial dimension between their radial extremity edge 22 and the annular ring 16.

The radial teeth 18 are composed of a material having, for at least one particular electromagnetic property, for example of electrical conductivity, magnetic permeability and/or magnetization, a particular feature. In the example the radial teeth are made of electrically conductive material or include an electrically conductive material, for example a metallic material.

Two successive radial teeth 18 about the axis A1 are separated by an interdental space 24 which, for the same electromagnetic property, has a feature different from that of the radial teeth 18. In the example, this interdental space 24 is empty of any electrically conductive material. Note here that the interdental space 24 is illustrated as being an empty space. Note however that the target 20 could include a body made of neutral materials with regard to the electromagnetic property measured by the sensor, for example to ensure its attachment to a rotor. In the example of an inductive sensor, the target 20 could therefore include an attaching body made of plastic material which could be beside the radial teeth 18 or which could even coat the radial teeth 18. Similarly, the annular ring 16 could be made partly or entirely out of non-conductive materials, for example made of plastic material.

In the example, each interdental space 24 is therefore angularly delimited by the lateral edges 20 of the two successive radial teeth 18 which are adjacent each on one side of this interdental space 24. Each interdental space 24 therefore has an angular dimension defined by the two adjacent radial teeth. In the embodiment, all the interdental spaces 24 have the same angular dimension. Similarly, in the embodiment illustrated, the interdental spaces 24 have the same angular dimension as the radial teeth 18.

The target 12 comprises several radial teeth 18, and comprises the same number Nc of interdental spaces 24 as the number of radial teeth 18. In the example of FIG. 1, the target includes eight radial teeth 18, and therefore as many interdental spaces 24. In the example, a radial tooth 18 and an adjacent interdental space 24 form a contrast area Zk within the meaning of the invention, A contrast area therefore has a mechanical angular dimension about the axis A1 which has a value of 2Pi/Nc radians of angle.

As seen above, it is possible to identify each contrast area Zk by a rank k, integer, contained in the range 1 to Nc. The rank k corresponds to the order of mechanical angular position of the contrast area with respect to the other contrast areas about the axis of rotation. The rank k therefore corresponds to the physical arrangement of the contrast areas on the target. Thus, when the target passes in front of a location under consideration, one sees pass the contrast area of rank 1, then that of rank 2, then that of rank 3 and so on until that of rank Nc, which will be followed, after 2Pi radians of mechanical angle of rotation of the rotor, again by the contrast area of rank 1. Of course, if the rotor is turning in the reverse direction, the order of passage will also be reversed.

The detector 14 typically includes several measuring cells, here two measuring cells, arranged respectively at separate measurement locations, here P1 and P2, and each able to measure the intensity of one and the same electrical or magnetic variable at the corresponding measurement location. The detector 14 could include three measuring cells arranged at three separate measurement locations respectively. Preferably, the cells are identical in the sense that they produce one and the same electrical signal value if the same electromagnetic variable is present at their respective measurement location. However, the simulations show that the invention operates satisfactorily including with slight inhomogeneities between the cells and/or their signal processing channels. In the context of an inductive-type sensor, each measuring cell may for example include a measuring winding B1, B2. In the example of FIG. 2, the measuring windings B1, B2 of the two cells are identical but are angularly offset about the axis A1 by a known mechanical angle value "alpha". In the example of FIG. 3, the measuring windings B1, B2 of the two cells are different. One may define for each measuring cell a measurement location. For a cell, this measurement location can be arbitrarily defined. This measurement location is of course related to the position and to the geometry of the measuring winding of the measuring cell under consideration. With regard to the invention, one may for example arbitrarily define the measurement location as being a central position with respect to the measuring windings, which is schematically represented in FIG. 2. Such a central position is for example defined in a similar manner to the determination of a barycenter. Preferably, the measurement location will be defined identically for all the measuring cells.

In the example, the measuring windings B1, B2 are produced in the form of printed circuits, here on one and the same printed circuit board 26. The measuring windings B1, B2 are connected to an electronic control unit 28, here borne by the same printed circuit board 26, and the electronic control unit 28 is connected to a computer communication interface, for example a connector 30 which can itself also be borne by the printed circuit board. The electronic control unit 28 of the sensor 10 for example includes a microprocessor, of the electronic memory and of the electronic input/output interfaces. The connector 30 makes it possible to implement a computer link, by a computer communication network, for example a serial link or a multiplexed network of CAN-bus type, with an external electronic system to which the sensor 10 is electronically connected, the external system being itself able to include one or more electronic control units using the angular position information delivered by the sensor. Of course, the connector 30 can be replaced or completed, as computer communication interface, by a wireless electronic communication unit, for example of Wi-Fi®, Bluetooth® or other type. Provision can be made for the sensor 10 to include a detector 14 produced in the form of a detector box, comprising a box, preferably sealed, in which the measuring cells B1, B2 are arranged, the calculating unit 28 which is then a calculating unit in the box, integrated into the box, and the computer communication interface. Such a detector can be described as a "smart" detector which can be calibrated and tested before its integration into the external system.

According to the invention, the measurement locations P1, P2 of the cells are offset about the axis A1 by a given mechanical angle "alpha". In the illustrated example with measuring cells mounted on one and the same printed circuit board, the mechanical angle "alpha" between the measurement locations of the cells is determined at the time of manufacturing of the detector. However, it could also be envisioned to have a detector made in several parts, the measuring cells being arranged on different parts of the detector. In this case, the mechanical angle "alpha" between the measuring cells, and therefore the measurement locations, would be determined at a later stage of assembly of the detector or during the assembly of different parts of the detector on the associated part. In operation, the mechanical angle "alpha" between the measurement locations P1, P2 is fixed.

In the illustrated examples, note that the measuring cells correspond to separate measurement locations, but that the corresponding measuring windings B1, B2 overlap angularly about the axis. The windings could be entirely angularly offset with respect to one another.

Regarding sensors of inductive type, the detector 14 includes a primary winding B0 which is intended to create a magnetic field in space with regard to the measuring cells. In the example, the primary winding B0 extends in a plane perpendicular to the axis A1, and delimits in this plane a primary winding contour which encompasses the two measuring windings B1 and B2.

Examples of inductive-type sensors and their operating principles are known, for example from the documents US2019017845, EP-0.182.085-A2 or FR-3.023.611-A1.

FIG. 3 very schematically illustrates the operation of an exemplary embodiment of an inductive sensor. A voltage source 32 causes an electric current to flow through the primary winding B0 which creates a primary magnetic field in front of the primary winding B0. The detector includes, for each measuring winding B1, B2, an element M1, M2 for measuring the voltage and/or the intensity of the current in the measuring winding B1, B2. This measuring element M1, M2 delivers a raw electrical signal SB1, SB2 representative of the voltage and/or the intensity of the current in the measuring winding B1, B2 under consideration, thus representative of the magnetic field in front of the measuring winding under consideration. In the absence of any perturbing element, each measuring winding B1, B2 is traversed by an electrical current or generates a voltage, the value of which depends on the primary electromagnetic field created by the primary winding B0. This FIG. 3 shows a radial tooth 18 which circulates in front of the measuring windings B1, B2, and therefore also in front of the primary winding B0. When the radial tooth 18 faces the primary winding B0, it is exposed to the primary magnetic field created by this primary winding B0 such that eddy currents are induced in the radial teeth 18. The eddy currents themselves generate a counter-electromagnetic force field which then locally perturbs, with regard to the radial tooth 18, the primary electromagnetic field created by the primary winding B0. In this way, when the radial tooth 18 is facing one or the other of the measuring windings B1, B2, the magnetic field viewed by the measuring winding B1, B2 under consideration is composed of the superimposition of the primary magnetic field and of the counter-electromotive force field created by the radial tooth 18, which manifests as a variation in the current and/or the voltage in the measuring winding B1, B2, and therefore by a variation in the electrical signal SB1, SB2 delivered by the corresponding measuring element M1, M2.

The electrical signals SB1, SB2 delivered by the measuring elements M1, M2 are delivered to the electronic control unit 28 which, by appropriate electronic processing, is capable of delivering corresponding electrical signals S1, S2, each representative of the intensity of the electrical or magnetic variable at the corresponding measurement location, here representative of the magnetic field at the corresponding measurement location.

In a manner known per se, the sensor is designed so that each contrast area, when it passes in rotation about the axis of rotation in front of a measurement location, induces a variation in the electrical measurement signal S1, S2 acquired at this measurement location which is a quasi-sinusoidal function of an electrical angular position θe of the contrast area with respect to the measurement location.

The electrical angular position θe is linked to the mechanical angular position θm of the target with respect to the measurement location, but it relates only to the angular extent of the contrast area under consideration. Locally, for a given contrast area in front of a measurement location, and if one expresses the electrical angular position θe and the mechanical angular position θm in the same unit, this gives the relationship:

$$\theta e = \theta m \times Nc, \text{modulo } 2Pi$$

Note that the electrical angular position θe varies by 2Pi radians for a variation of 2Pi/Nc radians of angle of the mechanical angular position θm of the target about the axis of rotation.

The number Nc of contrast areas Zk create, over one mechanical turn of the rotor with respect to the stator, the same number Nc of sinusoidal quasi-periods of the measurement signal S1, S2 as the number Nc of contrast areas.

In an ideal sensor comprising a number Nc of strictly identical contrast areas, the sensor would be such that each contrast area, when it passes in rotation about the axis of rotation in front of a measurement location, would induce a perfectly sinusoidal variation in the electrical measurement signal S1, S2 as a function of an electrical angular position θe. To each contrast area would correspond one electrical period of the signal. Over one mechanical turn of the target, the number of electrical periods of the signal would be equal to the number of contrast areas. With such a sensor, it should not be possible to identify which is the contrast area which, in a given electrical angular position θe, as determined by a simple direct analysis of the signals, is located facing or near the sensor.

Unlike an ideal sensor, the invention aims to exploit the non-ideal nature of a sensor to make it possible to determine which is the contrast area which, for a given angular position, is located facing or near the sensor, to thus determine a position of the rotor with respect to the stator which is a position over 2Pi radians of mechanical angle. This non-ideal nature is characterized by the fact that at least two of the contrast areas Zk exhibit a physical difference between one another. In practice, there will often be more than two contrast areas which, pairwise, exhibit a physical difference between one another.

As the contrast areas follow continuously about the axis of rotation during the rotation of the target with respect to the detector, the number Nc of contrast areas Zk create, over one mechanical turn of the rotor, a same number Nc of quasi-sinusoidal periods, hereinafter referred to as quasi-periods for each measurement signal S1, S2, as the number Nc of contrast areas. Specifically, the physical differences between the contrast areas of the target create, between at least two quasi-periods of the measurement signal over one and the same turn of the target, a difference in the measured signal over the two quasi-periods. The at least two contrast areas Zk exhibit a physical difference between one another which creates, between at least two separate quasi-periods of the measurement signal over one and the same signal turn, a difference in the amplitude of the intensity of the physical variable measured in said at least two separate quasi-periods of the measurement signal respectively. This difference in the signal can in particular pertain to the maximum and/or minimum value of the intensity of the physical variable measured in said at least two separate quasi-periods of the measurement signal respectively. These differences justify the name "quasi-periods".

It is understood that the physical difference between the at least two contrast areas must be sufficient for it to be measurable repetitively in the measurement signal.

The physical difference between the two contrast areas can result from a difference between the two contrast areas pertaining for example to:
- an intrinsic geometrical difference, for example a dimensional difference, a difference in planarity, a difference in orientation etc.;
- and/or a difference in electromagnetic feature, for example related to an inhomogeneity of the component material or materials of the contrast areas;
- and/or other parameters.

The physical difference between the two contrast areas can also result from a difference in relative position, for said two contrast areas, between the contrast area of the target and the detector 14. For example, in the embodiment described above, provision can be made for the radial teeth 18 to extend in a plane perpendicular to the axis of rotation A1. However, it may occur that one or more radial teeth 18 has or have an inclination with respect to this plane such that the distance, along the direction of the axis of rotation A1, between the radial tooth of one of the contrast areas and the detector, is different from the distance between the radial tooth of another contrast area and the detector. In this case, even if all the other parameters are also equal between the two contrast areas, the amplitude of the quasi-sinusoidal signal measured at a measurement location given by the detector 14 will be different for the two contrast areas.

The physical difference between the two contrast areas can be voluntary or involuntary. It is voluntary if the difference corresponds to a design of the sensor or of its installation in which a deliberate choice is made to have such a difference, which can then be either known or unknown.

The physical difference between the two contrast areas can be involuntary, in the sense that it can be related to dispersions of manufacturing or installation of the sensor. In particular, with a sensor comprising a detector mounted on one part and a target mounted on another part movable with respect to the first, it is virtually inevitable that the attachment of the detector and of the target to the corresponding part will be done independently for the detector and for the target. In this way, the relative position of the target with respect to the sensor along the direction of the axis of rotation A1 depends on the way in which one and the other of the components are attached. However, if the target is mounted on the corresponding part, for example the rotor, with a slight misalignment between the axis of the target and the actual axis of rotation of the rotor, when the target turns, the movement of the target with respect to the detector will not be a perfectly circular and planar movement, but a quasi-circular movement exhibiting for example a decentering and/or having a beat, a beat which corresponds to the variation, from one contrast area to another, of the distance between the contrast area and the detector 14 along the axis of rotation A1, as described above.

Such a phenomenon is for example illustrated in FIG. 5 which illustrates the signals S1 and S2 corresponding to the measurement of the physical variable at the first measurement location P1 and at the second measurement location P2 with a sensor comprising four contrast areas. The signals are here represented for their variation over one full mechanical turn of the target, i.e. over 2Pi radians of mechanical angle of rotation of the rotor with respect to the stator. Note that, in this extent of 2Pi radians of mechanical angle, each signal includes four quasi-periods, each quasi-period having a positive half-quasi-period and a negative half-quasi-period with respect to an offset value S1$m$, S2$m$ for the signal under consideration. The offset value of a signal is for example the mean value of this signal, for example an arithmetic mean, over a determined time period corresponding to an integer number of quasi-periods, preferably over a number Nc of quasi-periods, i.e. over one mechanical turn.

Within the meaning of the invention, one defines as being an example of a quasi-sinusoidal function of an electrical angular position θe a function that can be written:

$$S1(\theta e, \theta m) = Anom1 \times (1 + dA(\theta m + phi1)) \times \sin(\theta e + phi1) + S1m,$$

$$S2(\theta e, \theta m) = Anom2 \times (1 + dA(\theta m + phi2)) \times \sin(\theta e + phi2) + S2m,$$

$$S3(\theta e, \theta m) = Anom3 \times (1 + dA(\theta m + phi3)) \times \sin(\theta e + phi3) + S3m,$$

with
- Anom1, Anom2, Anom3 amplitude values, which can be considered as constant;
- dA(θm) an amplitude modulation function,
- phi1, phi2 and where applicable phi3, phase shift values which depend on the chosen measurement locations, which are also considered as constant,
- S1$m$, S2$m$, S3$m$ of the offset values, which are considered as being constant, and which can for example correspond to slight inhomogeneities between the cells and/or their signal processing channels,
- and recalling that, within one and the same contrast area:

$$\theta e = \theta m \times Nc, \text{modulo } 2Pi.$$

Such a quasi-sinusoidal function therefore has a sinusoidal base sin(θe+phi) which determines the electrical quasi-periods, the angular extent of which has a value of 2PI/Nc, which corresponds to the angular extent of a contrast area. The amplitude modulation function dA(θm+phi) is a function, preferably continuous, which is periodical over one mechanical turn of the target, and the value of which varies at the most between +0.5 and −0.5, preferably at the most between +0.25 and −0.25. The amplitude modulation function manifests, as its name indicates, the irregularities that are observed as regards the local maximum of the absolute value of the signal at each of its half-quasi-periods.

In the example illustrated in FIG. 5, the offset value S1$m$, S2$m$ is non-zero. Such offsets of the offset value are not desired but undergone. They may for example be due, among other things, to an inhomogeneity of the generated magnetic field, which can be greater near the edges of the primary winding B0 than at its center. In certain embodiments, such offsets of the offset value can be due to the fact that the windings B1 and B2 cannot be both centered with respect to the primary winding B0. It can be seen very clearly that, from one quasi-period to another, the maximum of the absolute value of the signal, with respect to the offset value, is not the same. In this way, over the 2Pi radians of mechanical angle, the signal therefore has quasi-sinusoidal features in that it includes a succession of positive half-quasi-periods and negative half-quasi-periods. The signal exhibits, between the quasi-periods, at least variations in the amplitude of the signal. Within one and the same quasi-period, or even a same half-quasi-period, the signal does not perfectly follow a sinusoidal curve. However, by construction, the deviation from a sinusoidal curve is sufficiently reduced for one to be able to implement a determination of the electrical angular position θe of the contrast area with respect to the measurement location, with an acceptable accuracy. This is done by a calculation law taking into account the arctangent of the ratio of the values of the two measurement signals for the time under consideration. By convention, one will have an acceptable accuracy if the electrical angular position θe of the contrast area with respect to the measurement location is determined by a calculation law taking into account the arctangent of the ratio of the values of the two measurement signals for the time under consideration with an error less than 10% of one electrical quasi-period, the angular extent of which has a value of 2PI/Nc, preferably less than 5% of one electrical quasi-period, more preferably less than 1% of one electrical quasi-period. Specifically, such a level of accuracy is necessary since, as it will be seen further on, this calculated value of the electrical angular position is involved in the mechanical angular position information that will be delivered by the sensor.

In the case implementing two measurement signals at two separate measurement locations, the method makes provision for the measurement locations to be offset about the axis of rotation by a corresponding mechanical angle "alpha", modulo the angular extent of the contrast areas, so modulo 2Pi/Nc radians of angle, to [Pi/(2×Nc)] radians of angle, one quarter of one electrical quasi-period. Preferably, the mechanical angle "alpha" between the two measurement locations has a value of [Pi/(2×Nc)] radians of angle, such that the two measurement locations are as close as possible, in such a way as to make the detector as compact as possible. Thus, the closeness of the measurement locations ensures that the two signals undergo a similar amplitude modulation. In other words, the modulation function dA(θm) does not include any significant changes in an interval [Pi/(2×Nc)]. The measurement error incurred by this modulation will thus be small.

However, provision can be made for the mechanical angle "alpha" between the two measurement locations to have a value of [Pi/(2×Nc)]+(ke×2Pi/Nc) radians of angle, with ke a non-zero integer index of separation. In this case, the two measurement locations are further from one another, which can facilitate the manufacturing and/or installation of the detector. In this case one must ensure that the modulation function dA(θm) does not include any significant changes in an interval of [Pi/(2×Nc)]+(ke×2Pi/Nc).

In both cases, owing to such a disposition, it is possible to write the variation of the two signals acquired at two separate locations in the form of two functions, one as a sine and the other as a cosine of the same variable.

Thus, under these conditions, one can write, at least within one given quasi-period Tk corresponding to a given contrast area Zk:

$S1(\theta e, \theta m) = Anom1 \times (1 + dA(\theta m)) \times \sin(\theta e + phi1) + S1m,$ $S2(\theta e, \theta m) = Anom2 \times (1 + dA(\theta m)) \times \cos(\theta e + phi1) + S2m,$ and $\theta e = Nc \times \theta m$ and $dA(\theta m + alpha)$ little different from $dA(\theta m)$ With an appropriate positioning of the two sensors, one can have phi1=0

In these conditions, it is then possible to very easily determine the electrical angular position θe of the contrast area with respect to the measurement locations, this by a calculation law taking into account the arctangent of the radio of values of the two measurement signals for the time under consideration. This calculation is done by computer for example by the electronic control unit 28, including when it is integrated into a detector box as described above, or by a remote electronic control unit.

To determine the value of θe it is possible to use the function atan2(S2, S1) which exists in many programming languages. The two-argument atan2 function is based on the arctangent function. In mathematical terms, atan2 returns the main value, in the interval [−Pi, Pi] of the argument function applied to the complex number (x+iy). In the examples, one may prefer to work in the interval [0; 2PI], by thus bringing the returned value by the atan2 function within this interval. In other words, to determine an estimate of the value of the electrical angular position De, it will be possible to use the function defined as follows:

$\theta e = \arctan(S1/S2)$ if $S1 \geq 0$ and $S2 > 0$ $\theta e = \arctan(S1/S2) + PI$ if $S2 < 0$ $\theta e = \arctan(S1/S2) + 2*PI$ if $S1 < 0$ and $S2 > 0$ $\theta e = PI/2$ if $S1 > 0$ and $S2 = 0$ $\theta e = 3*PI/2$ if $S1 < 0$ and $S2 = 0$ $\theta e$ undefined if $S1 = 0$ and $S2 = 0$ For the case where one uses three measurement signals acquired at three separate locations, the invention makes provision for the measurement locations to be offset about the axis of rotation A1 by a mechanical angle "alpha" corresponding to [2Pi/(3×Nc)] radians of angle, or one-third of the electrical angular quasi-period). Next, one applies to the three measurement signals for the time under consideration a Clarke's transform which makes it possible to obtain two transforms, to which one can then apply a calculation law taking into account the arctangent of the ratio of the values of the two transforms obtained to determine the electrical angular position θe, as indicated above.

Note that the invention makes it possible to implement a target that does not have any "holes", i.e. no missing contrast areas. In other words, the target used is a target wherein, as a first approximation, the contrast areas are sufficiently identical to one another for the determination of the electrical angular position θe of the contrast area with respect to the measurement locations, and doing this by a calculation law taking into account the arctangent of the ratio of the values of the two measurement signals for the time under consideration, gives a correct value for all the contrast areas, over the 360 degrees of mechanical angle about the axis of rotation of the target 12. Similarly, one may consider that the contrast areas follow one another without discontinuity between the contrast areas over the 360 degrees of mechanical angle about the axis of rotation of the target 12, this insofar as the determination of an estimate of the electrical angular position θe of the contrast area with respect to the measurement locations, by a calculation law taking into account the arctangent of the ratio of the values of the two measurement signals for the time under consideration, gives a correct value over the 360 degrees of mechanical angle about the axis of rotation of the target 12.

The invention makes provision for a measurement method which includes a calibration phase, then, subsequently, at least one measurement session which includes a setting phase. Between the calibration phase and the measurement session, there may be a relative rotation of the target 12 of the sensor 10 with respect to the detector 14 of the sensor 10, even if the sensor 10 cannot "see" this rotation, for example because it is no longer electrically powered. In other words, between the calibration phase and a measurement session, the sensor 10 can be "switched off".

During the calibration phase, then again during a setting phase of a measurement session, the method makes provision for the acquisition of the Ns electrical measurement signals S1, S2. The acquisition is preferably done over at least one target turn. For a setting phase of a given measurement session, the acquisition of the signals can be done over a single mechanical turn of the target about the axis of rotation. In a variant, it is possible, for a phase of setting of a given measurement session, to acquire the signals over several mechanical turns of the target about the axis of rotation, and take, for each mechanical angular position over 360 degrees of angle, a mean of the different measurements carried out over different turns. Thus, one can take the mean and therefore filter the measurement noise. Preferably, the acquisition is made constantly over one mechanical turn of the target. Preferably, the acquisition is made in an angular resolution less than give electrical degrees (so less than 5/Nc mechanical degrees), preferably less than or equal to one electrical degree (so less than or equal to 1/Nc mechanical degrees). Preferably the acquisition is made for each mechanical turn of the target, over one mechanical turn of the target about the axis of rotation. Each angular position of the target is here understood as being defined by the maximum angular resolution of the sensor.

Note that, during the calibration phase, one may choose to acquire the signals when the relative speed of rotation between the rotor and the stator is constant. This makes it possible to acquire a signal as a function of time which can be transformed into a signal as a function of the mechanical angular position without it being necessary to use, in addition, an absolute reference position sensor on the calibration bench. In this case, a rotational marker which defines the origin of the mechanical position will be sufficient. In certain special cases of application, for example when the mechanical angular position delivered by the sensor serves solely to define a law of linearization of the sensor over one mechanical turn, it is also possible to define the origin of the mechanical position arbitrarily during the calibration phase without any outer reference. If the calibration bench possesses an absolute position sensor, it is then possible to obtain, on the basis of a signal acquired as a function of time, a signal as a function of the mechanical angular position even if the relative speed of rotation between the rotor and the stator is not constant during the acquisition over one mechanical turn of the target.

On this basis, it is then possible to compute an instantaneous value of the electrical angular position θe for the mechanical angular position θm under consideration. The instantaneous value of the electrical angular position θe thus computed is of course an estimate of the instantaneous angular position θe value. This calculation can be done for each mechanical angular position over one mechanical turn of the target about the axis of rotation for which one has acquired measurement signals S1 and S2. This calculation is made by a law of calculation of the electrical angular position taking into account, as indicated above:

for Ns=2, the arctangent of the ratio of the values of the two measurement signals for the time under consideration, or for Ns=3, the arctangent of the ratio of the values of the transforms obtained by a Clarke transform applied to the three measurement signals for the time under consideration.

The electrical angular position θe thus determined is an angular position which may be defined in an interval of an extent of a value of 2PI, this interval corresponding to one contrast area, and therefore to a mechanical angular sector, the extent of which takes the value of that of one contrast area, namely 2Pi/Nc radians of mechanical angle.

In the following example, provision is made, from this electrical angular position de, to then compute, for example in the electrical angular position 28, including when it is integrated into a detector box as described above, or in a remote electronic control unit, of an instantaneous value of the incremented electrical angular position θe_inc. The instantaneous incremented electrical angular position value corresponds to the electrical angular position θe, and is therefore evaluated in correspondence with a quasi-period of the signals corresponding to one contrast area, to which is added the angular extent corresponding to the quasi-periods that have elapsed since the start of the incrementation. This value is computed modulo one turn of the target.

This instantaneous value of the incremented electrical angular position can for example be obtained by incrementing a counter X of a unit for any variation of 2Pi of the electrical angular position θe, this variation being carried out in the same direction of rotation.

Thus, in a first example, the instantaneous value of the incremented electrical angular position can for example be obtained according to the relationship:

$$\theta e\_inc = \mathrm{mod}((\theta e + X \times 2Pi)/Nc, 2Pi)$$

In this example, it can be seen that the instantaneous value of the incremented electrical angular position varies by 2Pi radians of angle for one mechanical turn of the target.

However, the instantaneous value of the incremented electrical angular position could for example be obtained according to the relationship:

$$\theta' e\_inc = \mathrm{mod}(\theta e + X \times 2Pi, Nc \times 2Pi)$$

In this example, it can be seen that the instantaneous value of the incremented electrical angular position varies by Nc×2Pi radians of angle by one mechanical turn of the target.

In both cases, whether the instantaneous value of the incremented electrical angular position is obtained directly from the value of the electrical angular position De, but it is incremented to be a bijective function of the mechanical angular position θm of the target. In this regard, the instantaneous value of the incremented electrical angular position is descriptive of one full mechanical turn of the target.

In the rest of the text, one will more specifically develop the first example above in which the instantaneous value of the incremented electrical angular position could for example be obtained according to the relationship:

$$\theta e\_inc=\mathrm{mod}(\theta e+X\times 2Pi)/Nc, 2Pi)$$

It will therefore be understood that, due to its bijective nature, the instantaneous value of the incremented electrical angular position corresponds to a value out of the 2Pi radians of mechanical angle. However, at this stage, this instantaneous value of the incremented electrical angular position θe_inc does not make it possible to determine a relative position of the rotor that is unique over 2Pi radians of mechanical angle with respect to the stator. Specifically, as one does not know what was, at the start of the incrementation, i.e. at the start of the calculation of the incremented electrical angular position θe_inc, the initial relative position of the rotor, over 2Pi radians of mechanical angle, with respect to the stator, one does not know the instantaneous position over 2Pi radians of mechanical angle with respect to the stator. In practical terms, the instantaneous incremented electrical angular position θe_inc value makes it possible to know the relative angular position of a contrast area with respect to the stator, but does not make it possible to know which of the contrast areas is in front of the detector. In other words, it can be considered that the incremented electrical angular position θe_inc is equivalent to the mechanical angular position θm, but with an unknown original angular phase shift. This original angular phase shift is equivalent to the mechanical angular position θm0 of the rotor with respect to the stator for the original position of the calculation of the incremented electrical angular position θe_inc.

Hence, during a measurement, this gives θm=θe_inc+θm0.

In practice, it is advantageous to take as origin of the calculation of the incremented electrical angular position θe_inc an angular position for which the electrical angular position θe takes a reference value, for example 0. In the formula above, θe_inc=mod((θe+X×2Pi)/Nc, 2Pi), the original position of the calculation of the incremented electrical angular position θe_inc is therefore that for which θe=0 and X=0.

It is understood that, in the absence of any specific precautions, the mechanical angular position θm0 of the rotor with respect to the stator for the original position of the calculation of the incremented electrical angular position θe_inc is different for the calibration phase and for each setting phase of each measurement session. This gives an original angular phase shift value θm0_cb for the calibration phase and an original angular phase shift value θm0_i for the setting phase of an "$i^{th}$" measurement session.

During the calibration phase, the mechanical angular position of the rotor with respect to the stator is therefore given by the formula:

$$\theta m=\theta e\_inc+\theta m0\_cb.$$

During an $i^{th}$ subsequent measurement session, the mechanical angular position of the rotor with respect to the stator is therefore given by the formula:

$$\theta m=\theta e\_inc+\theta m0\_i$$

The challenge is therefore to determine the angular measurement offset $$\mathrm{delta}\_i\_\theta m0=(\theta m0\_i-\theta m0\_cb)$$

between the mechanical angular position of the rotor with respect to the stator for the original position of the calculation of the incremented electrical angular position θe_inc, on the one hand for the setting phase of a measurement session under consideration, and on the other for the calibration phase.

If the precaution is taken of taking as origin of the calculation of the incremented electrical angular position θe_inc an angular position for which the electrical angular position De takes a reference value, for example 0, this angular measurement offset corresponds to an integer number of angular extents of one contrast area, this then gives $$\mathrm{delta}\_i\_\theta m0=(\theta m0\_i-\theta m0\_cb)=ki\times 2Pi/Nc$$

with ki an integer which is specific to each measurement session. Note that one can adopt the convention that the integer ki associated with a measurement session is contained in the range from 0 to (Nc−1). The number of ranks of offset for a given measurement session is then called ki.

However, the method according to the invention does not impose any such precaution.

In all cases, the angular measurement offset delta_i_θm0 is the difference between the mechanical angular position of the rotor with respect to the stator for an original measurement position, on the one hand for the setting phase of a measurement session under consideration, and on the other for the calibration phase.

The method according to the invention makes provision for the determination by computer of at least one electrical signature of the target.

In a calibration phase, an electrical calibration signature is determined by computer.

In a setting phase of a subsequent measurement session, an electrical setting signature is determined.

Each electrical signature is determined by a pair of signature values or a series of signature value pairs, the "$j^{th}$" pair of signature values comprising:
  a magnitude signature value $Asig_j$, derived from at least one of the values of at least one of the measurement signals S1, S2 for at least one angular position of the target;
  and an incremented electrical angular position signature value $\theta e\_inc\_sig_j$ for the angular position or positions of the target corresponding to the instantaneous magnitude value or values which were taken into account to determine the magnitude signature value $Asig_j$.

Further on will be given examples of rules for determining an electrical signature, and in particular examples of rules for determining a magnitude signature value $Asig_j$ and an incremented electrical angular position signature value $\theta e\_inc\_sig_j$. The electrical signature is significant of the features of a pair comprising a target and a detector as arranged on the rotor and on the stator respectively. A change in the target and/or the detector, and/or a disassembly/reassembly of the target and/or of the detector will preferably give rise to a new determination of the electrical calibration signature. Meanwhile, the electrical setting signature is determined in a setting phase at the start of each measurement session. A measurement session can be triggered for example at each start-up of the rotor/stator system for which one wishes to measure the angular position, so for example each time the sensor is electrically re-energized.

It is therefore understood that, for both the calibration phase and the setting phase, the electrical signature is determined as a function of the incremented electrical angular position, and therefore as a function of the original angular phase shift θm0, which corresponds to the mechanical angular position of the rotor with respect to the stator for the original position of the calculation of the incremented electrical angular position θe_inc. As this original angular phase shift θm0 is different for the calibration phase and for the setting phase of each measurement session, the electrical signature is therefore intrinsically linked to this original angular phase shift θm0.

In general, any pair of values $(Asig_j; \theta e\_inc\_sig_j)$ associating a magnitude signature value $Asig_j$ with an incremented electrical angular position value $\theta e\_inc\_sig_j$ can be used. Preferably, each pair of values corresponds to a single occurrence of this pair of values over one mechanical turn of the target, to the nearest measurement tolerances.

Thus, according to a general example, an electrical signature SIG can take the form:

$$SIG = \{(Asig_1; \theta e\_inc\_sig_1); (Asig_2; \theta e\_inc\_sig_2), \ldots\}$$

In this general form, for one and the same sensor, one can therefore determine an electrical calibration signature that can be written $$SIGcb = \{(Asigcb1; \theta e\_inc\_sigcb1); (Asigcb2; \theta e\_inc\_sigcb2), \ldots\}$$

and an electrical setting signature, for a corresponding "$i^{th}$" measurement session, which can then be written $$SIGi = \{(Asigi1; \theta e\_inc\_sigi1); (Asigi2; \theta e\_inc\_sigi2-), \ldots\},$$

In the general case, this form is therefore that of a two-row matrix, one row for the magnitude signature values $Asig_j$ of a pair of signature values, and one row for the incremented electrical angular position values of a pair of reference values. The number of columns of the matrix depends on the number of pairs of reference values. In such a matrix, the row of magnitude signature values $Asig_j$ of the pairs of reference values can be considered as an ordered vector of magnitude signature values $Asig=(Asig_1, Asig_2, \ldots)$, and the row of the incremented electrical angular position signature values $\theta e\_inc\_sig_j$ of the pairs of reference values can be considered as an ordered vector of incremented electrical angular position signature values $\theta e\_inc\_sig=(\theta e\_inc\_sig_1, \theta e\_inc\_sig_2, \ldots)$.

Of course, this signature can also be written in a transposed form, and therefore in the form of a two-column matrix, one column for the magnitude signature values $Asig_j$ of the pairs of reference values, and one column for the incremented electrical angular position values of the pairs of reference values. The number of rows of the matrix then depends on the number of pairs of reference values. In such a matrix, the column of the magnitude signature values $Asig_j$ of the pairs of reference values may be considered as an ordered vector $Asig_j$ of magnitude signature values, and the column of the incremented electrical angular position signature values $\theta e\_inc\_sig_j$ of the pairs of reference values may be considered as an ordered vector $\theta e\_inc\_sig$ of incremented electrical angular position signature values.

In certain cases, one may retain, and in particular record by computer, as an electrical signature, solely an ordered vector Asig of magnitude signature values, or solely an ordered vector $\theta e\_inc\_sig$ of incremented electrical angular position signature values. For example, in certain cases, the rule of determination of the electrical signature directly determines the ordered vector Asig of magnitude signature values, or the ordered vector $\theta e\_inc\_sig$ of incremented electrical angular position signature values, such that, in this case, it is not necessary to record it by computer. In this case, it is therefore enough to retain, in particular by computer recording, solely the other out of the ordered vector Asig of magnitude signature values, or the ordered vector $\theta e\_inc\_sig$ of incremented electrical angular position signature values, i.e. that which is not directly determined by the rule of determination of signature values of the electrical signature.

In order to increase the robustness of the system, it can for example be advantageous to use as the pair of signature values at least a pair of signature values $(Asig_j, \theta e\_inc\_sig;)$ of which the instantaneous magnitude value $Asig_j$ is most clearly differentiated from the other instantaneous magnitude values corresponding to the same (non-incremented) electrical angular position value.

To determine a pair of signature values, one may therefore have cause to determine a magnitude signature value $Asig_j$. This value must be derived from at least one of the values of at least one of the measurement signals S1, S2 for at least one angular position of the target, according to a rule of determination of magnitude signature values. According to an embodiment, the magnitude signature value is derived from at least one instantaneous magnitude value which is representative of the intensity of the physical variable for the angular position under consideration. The instantaneous magnitude value is for example determined by a law of calculation of the instantaneous magnitude values. This law of calculation of the instantaneous magnitude values uses at least one of the values of at least one of the measurement signals S1, S2 for at least one angular position of the target. Secondly, the rule of determination of magnitude signature values uses one or more instantaneous magnitude values.

A first example of determination of an electrical signature will now be described with reference to FIG. 6, which is based on the measurement signals S1 and S2 as shown in FIG. 5.

FIG. 6 again illustrates the measurement signals S1 and S2. The abscissa axis corresponds to the axis of the incremented electrical angular positions. It is recalled that the incremented electrical angular positions correspond to the mechanical angular positions, to the nearest original angular phase shift, which, at this stage, is not known.

FIG. 6 also shows the electrical angular position θe as it is calculated by a law of calculation of the electrical angular position, as defined above. This example uses the calculation law derived from the atan2 function but which returns a value of θe between 0 and 2Pi:

$\theta e = \arctan(S1/S2)$ if $S1 \geq 0$ and $S2 > 0$ $\theta e = \arctan(S1/S2) + PI$ if $S2 < 0$ $\theta e = \arctan(S1/S2) + 2*PI$ if $S1 < 0$ and $S2 > 0$ $\theta e = PI/2$ if $S1 > 0$ and $S2 = 0$ $\theta e = 3*PI/2$ if $S1 < 0$ and $S2 = 0$ The electrical angular position is thus here a discontinuous function over one mechanical turn of the target 12, but has quasi-periods T1, T2, . . . , T4 the angular extent of which takes the value 2Pi/Nc, and, over each quasi-period, corresponding to one contrast area, the electrical angular position is a linear function of the incremented electrical angular position. For each contrast area passing in front of the detector, the electrical angular position varies from 0 to 2Pi over the angular extent of the contrast area, i.e. over a mechanical angular extent taking a value of 2Pi/Nc radians of angle. It is here recalled that, in the exampled used for FIGS. 5 and 6, the target includes four contrast areas.

FIG. 6 also shows the variation of the function A=square_root (S1^2+S2^2). This function is an example of a law of calculation of an instantaneous magnitude value, representative of the intensity of the physical variable for the angular position under consideration, which can be implemented in a rule of determination of magnitude signature values. The function A=square_root (S1^2+S2^2) is therefore equivalent to calculating the square root of the sum of the squares of the measurement signal values for an angular position of the target. It is therefore indeed representative of the intensity of the physical variable measured for the angular position under consideration. The function A is calculated for different angular positions over one mechanical turn of the target.

However, other calculation functions can be implemented as law of calculation of an instantaneous magnitude value, representative of the intensity of the physical variable for an angular position under consideration. For example, the function A=(S1^2+S2^2) could be used. According to another example, one could use a function of the type involving a linear combination of the measurement signal values for this angular position, which could for example be written A=a S1+bS2+c, with a, b and c of the parameters, or else A=square_root (a S1^2+b S2^2+c), with a, b and c parameters, or else A=(a S1^2+b S2^2+c), with a, b and c parameters. Note that, in these last three examples, one or the other of the parameters a and b can be zero, but not both. Similarly, the parameter c can be zero.

According to another example, one could use a function of the type involving a linear combination of the absolute measurement signal values S1, S2 for this angular position. In such an example, the linear combination of the absolute values could simply be the sum of the absolute measurement signal values for this angular position.

Given that the value of the signals S1 and S2 is used to determine the absolute position, it is important to take into account all the parameters that can influence these signals. It may be advantageous to work in relative values in relation to the peak-to-peak values marked over one mechanical turn, namely the minimum value and the maximum value marked over one mechanical turn, in order to compensate for slow effects such as temperature variation for example. If the sensor includes an amplification stage with variable gain, one may take into account the gain value, or else repeat the measurements of the peak-to-peak values over one mechanical turn after each change of gain.

In all cases, one could, in the law of calculation of an instantaneous magnitude value representative of the intensity of the physical variable for an angular position under consideration, correct (for example reduce) each measurement signal value by an offset value of this signal.

In the example illustrated in FIG. 6, it can be seen that the instantaneous magnitude value given by the function A=square_root (S1^2+S2^2) is not constant over the entire extent of one full mechanical turn of the target. Note moreover the instantaneous magnitude value given by the function A=square_root (S1^2+S2^2) is not constant over an angular extent corresponding to one contrast area. However, it should be noted that the instantaneous magnitude value given by the function A=square_root (S1^2+S2^2) would be constant over one full mechanical turn of the target if one were dealing with an ideal sensor delivering perfectly sinusoidal signals S1 and S2.

Note that the set of the pairs of values which, over one full mechanical turn, associate the instantaneous magnitude value with the corresponding incremented electrical angular position, forms an example of an electrical signature of the sensor. In this case, the rule of determination of magnitude signature values consists in taking into account all the calculated values of instantaneous magnitude value. However, according to the number of measurement points over one full turn of the target, the volume of data needed to represent this electrical signature, and therefore the quantity of memory needed for storage, would be considerable. This would also have consequences on the volume of calculations needed for the processing of this electrical signature, which would itself become considerable.

Also, it is possible to define an electrical signature of the sensor which requires a smaller volume of data, using another rule of determination of signature values.

For example, rather than retaining one pair of values for all the measurement points, it is possible to retain only the pairs of values corresponding to identifiable magnitude values, by applying a rule of determination of the magnitude signature values that consists in selecting only a few of the instantaneous magnitude values. Thus, one may choose to retain only two pairs of values corresponding to local maxima of the instantaneous magnitude value given by the function A serving as a law of calculation of the instantaneous magnitude value. In the example of FIG. 6, there are two local maxima Amax1 and Amax2, respectively corresponding to the incremented electrical angular positions θe_inc_max1 and θe_inc_max2. In this case, one can define an electrical signature SIG as being the set of two pairs of signature values:

$$SIG=\{(A\max 1;\theta e\_inc\_\max 1);(A\max 2;\theta e\_inc\_\max 2)\}$$

Of course, one could retain solely the pairs of values corresponding to local minima of the instantaneous magnitude value given by the function A, with the signature that would then be of the form of a set of signature values of the form { . . . ; (Amin; θe_inc_min); . . . }. In yet another variant, one could retain the pairs of values corresponding to local maxima of the absolute value of the instantaneous magnitude value given by the function A.

For the case in which there are numerous local maxima or local minima, the rule of determination of the magnitude signature values could select certain of them, for example retaining only a predefined number of local maxima or minima, and/or a predefined number of local maxima and/or minima per quasi-period Tk of the electrical angular position θe, etc., According to the case, the rule of determination of the magnitude signature values could retain only one pair of signature values, corresponding for example to an absolute maximum Amax or to an absolute minimum Amin of the instantaneous magnitude value given by the function A of calculation of an instantaneous magnitude value representative of the intensity of the physical variable. For the case where the rule of determination of the magnitude signature values retains only a single pair of signature values corresponding to an absolute maximum Amax or to an absolute minimum Amin of the instantaneous magnitude value given by the function A of calculation of an instantaneous magnitude value representative of the intensity of the physical variable, provision can be made for the pair of signature values to include:

by way of magnitude signature value, the absolute maximum Amax and the absolute minimum Amin respectively, of the instantaneous magnitude value given by the function A;

by way of angular position signature value, the electrical angular position corresponding to the absolute maximum Amax, and to the absolute minimum Amin respectively, said electrical angular position thus associated with an extremum of the function A implicitly forming an incremented electrical angular position since it can be uniquely determined over one mechanical turn by its association with the extremum.

In general, a pair of signature values is a pair corresponding to an identifiable value from among the pairs of values formed from an instantaneous magnitude value and from the corresponding incremented electrical angular position.

As seen in the preceding examples, this identifiable value can be a particular instantaneous magnitude value. Thus, one can define as being an identifiable value an instantaneous magnitude value that for example takes one of the following values: local maximum, local maximum over one quasi-period of the electrical angular position, local minimum, local minimum over one quasi-period of the electrical angular position, absolute maximum over one mechanical turn of the target, absolute maximum over one quasi-period of the electrical angular position, absolute minimum over one mechanical turn of the target, absolute minimum over one quasi-period of the electrical angular position, etc. . . . An identifiable value is not necessarily based on a maximum or minimum value. An identifiable value may be defined as an instantaneous magnitude value which for example takes a given value, for example a magnitude reference value, which can be the zero value, which can be the mean value over one mechanical turn of the target (which corresponds for example to the offset value), the mean value over one quasi-period of the electrical angular position, the mean value over one half-period of the electrical angular position etc. In the latter cases, the mean is for example the arithmetic mean. Typically, in such cases, it is often possible to retain, as signature, solely the ordered vector θe_inc_sig of the incremented electrical angular position signature values which correspond to these identifiable instantaneous magnitude values. In such an ordered vector, the magnitude reference value forms a magnitude signature value associated with the incremented electrical angular position signature value.

In a variant, this identifiable value may be a particular electrical angular position De. Thus, it is possible to implement a rule of determination of the magnitude signature values retaining one or more pairs of signature values corresponding for example to particular conditions of the electrical angular position θe. Thus, the rule of determination of the magnitude signature values can be designed to retain one or more pairs of signature values corresponding to one or more predefined values of electrical angular position θe. In this case, the signature can then include as many pairs of signature values as there are numbers of contrast areas, since there are, over one mechanical turn of the target, as many quasi-periods of the electrical angular position θe as there are contrast areas. In a variant, one could implement a rule of determination of the magnitude signature values designed to retain the pair or pairs of signature values corresponding to a predefined series of incremented electrical angular positions θe_inc. Typically, in such cases, it is often possible to retain, as signature, solely the ordered vector Asig of the magnitude signature values which correspond to these identifiable values of incremented electrical angular position. In such an ordered vector, the order rank of each of the magnitude signature values in the vector forms an incremented electrical angular position signature value associated with the magnitude signature value.

FIGS. 7, 8 and 9 illustrate an example implementing another rule of determination of signature values, here magnitude signature values. In this example, FIG. 7 illustrates, in the same way as FIG. 5, the signals S1 and S2 corresponding to the measurement of the physical variable at the first measurement location P1 and at the second measurement location P2 respectively, with a sensor comprising in this example six contrast areas. The signals are here also shown for their variation over one full mechanical turn of the target 12, i.e. over 2Pi radians of mechanical angle of rotation of the rotor with respect to the stator. It is noted that, over this extent of 2Pi radians of mechanical angle, each signal includes six quasi-periods, each quasi-period having a positive half-quasi-period and a negative half-quasi-period with respect to an offset value for the signal under consideration. As for the preceding example, from one quasi-period to another, the maximum of the absolute value of the signal is not the same. In this way, over the 2Pi radians of mechanical angle, the signal therefore has quasi-sinusoidal features in that it includes a succession of positive half-quasi-periods and negative half-quasi-periods.

FIG. 8, in which the abscissa axis is equivalent to the axis of the incremented electrical angular positions, also shows the electrical angular position θe as calculated by a law of calculation of the electrical angular position, as defined above. The electrical angular position is therefore here a discontinuous function over one mechanical turn of the target 12 but has half-periods T1, T2, . . . , T6, the angular extent of which has a value of 2Pi/Nc radians, and over each quasi-period T1, T2, . . . , T6, the electrical angular position θe is a linear function of the incremented electrical angular position.

FIG. 8 also shows the variation in the function A=square_root [(S1-S1m)^2+(S2-S2m)^2], which is used as law of calculation of an instantaneous magnitude value representative of the intensity of the physical variable for the angular position under consideration. In other words, for this example, each measurement signal value is reduced by an offset value of this signal, but the uncorrected signature values could be used. The variations in the electrical angular position De and in the instantaneous magnitude value are here also shown for their variation over one full mechanical turn of the target 12, i.e. over 2Pi radians of mechanical angle of rotation of the rotor with respect to the stator.

FIG. 9 again illustrates, with a larger scale for the ordinate axis, the variation of the function A=square_root [(S1-S1m)^2+ (S2-S2m)^2] used as the law of calculation of the instantaneous magnitude value, over one full mechanical turn of the target 12. It also illustrates for each quasi-period T1, T2, . . . , T6 of the electrical angular position θe, the mean value, for example the arithmetic mean value, Am1, Am2, . . . , Am6 of the instantaneous magnitude value over the quasi-period of electrical angular position under consideration. It can be seen that the mean value of the instantaneous magnitude value over the half-period under consideration is not the same for all the quasi-periods. In the example, each quasi-period has a different value Am1, Am2, . . . , Am6 of the mean value of the instantaneous magnitude value over the quasi-period under consideration.

Thus, in a rule of determination of the magnitude signature values, one could choose one, several or all of the values Am1, Am2, . . . , Am6 of the mean value of the instantaneous value to form one, several or Nc pairs of signature values.

In this example, the mean value of the instantaneous magnitude value, over the quasi-period under consideration is an example which makes it possible to attribute to a given angular range, in the extent of the 2Pi radians of angle of the incremented electrical angular position, a value representative of the intensity of the physical variable over this angular range. However, one may use a determination rule that implements another calculation of such a representative value.

For example, one could calculate, as the representative value for the angular range under consideration, for example for one quasi-period, the integral of the instantaneous magnitude value over the angular range under consideration. Or else one could choose, as a representative value for the angular range under consideration, for example for one quasi-period:
- a mean value, over this quasi-period angular range, of a linear combination of the squares of the values of the measurement signals, or of the square root of such a linear combination;
- a mean value, over this angular range, of a linear combination of the absolute measurement signal values;
- a minimum or a maximum of the instantaneous magnitude value over the angular range under consideration.

This last variant is then a generalization, for any given angular range, of what was described above in the example using a maximum or minimum over one quasi-period of the electrical angular position.

In all cases, each measurement signal value can be reduced by an offset value of this signal.

In each pair of signature values, the representative value used as magnitude signature value, here the mean value $Am1, Am2, \ldots, Am6$, is associated with an incremented electrical angular position signature value for the angular position or positions of the target corresponding to the instantaneous magnitude value or values which were taken into account to determine the magnitude signature value.

FIG. 10 illustrates the advantage of using, as magnitude signature value, a mean value of the instantaneous magnitude value over the quasi-period under consideration. Specifically, this figure illustrates the case where the signals S1 and S2 are particularly noisy. This of necessity results in the curve illustrating the instantaneous magnitude values over one mechanical turn of the target itself being particularly noisy. On the other hand, it can be seen that the impact of the noise on the mean values of the instantaneous magnitude value over the quasi-period under consideration is weak. One thus obtains a determination rule enabling a determination of the electrical signature that is particularly robust with respect to noise and measurement uncertainties.

According to one possibility, for a pair of signature values, the incremented electrical angular position signature value may for example correspond to the electrical angular position $\theta e\_inc\_T1, \theta e\_inc\_T2, \ldots, \theta e\_inc\_T6$ of the start, of the end, or of the middle, etc . . . , of the corresponding quasi-period $T1, T2, \ldots, T6$ for which the mean value of the instantaneous magnitude value over the quasi-period under consideration was calculated. In this case, the electrical signature can be written in the form:

$$SIG=\{(Am1;\theta e\_inc\_T1);(Am2; \theta e\_inc\_T2);(\ldots)\}$$

According to another possibility, for a pair of signature values, the incremented electrical angular position signature value may correspond to a rank of the corresponding quasi-period of the electrical angular position for which the magnitude signature value has been calculated. In this case, the rank corresponds to the order of the quasi-period under consideration of the electrical angular position with respect to the other quasi-periods of the electrical angular position within one quasi-period of the incremented electrical angular position. In this case, the signature may simply be written in the form of an ordered series of magnitude signature values, hereinafter referred to as an ordered vector, since the order of the series corresponds to the association with a rank, and the rank corresponds to an incremented electrical angular position signature value for the angular position or positions of the target corresponding to the instantaneous magnitude value or values which were taken into account to determine the magnitude signature value. The signature can then be written in the form of an ordered vector of magnitude signature values:

$$SIG=\{Am1;Am2; \ldots ;AmNc\}$$

In the example above the magnitude signature value is calculated for each quasi-period of the electrical angular position. However, it is quite possible to choose a finer resolution by calculating the magnitude signature value for each half-quasi-period or for each quarter-quasi-period for example.

In all cases, one may choose to increase the number of pairs of signature values retained for the signature by implementing a rule of determination of signature values, for example a rule of determination of magnitude signature values, retaining pairs of signature values corresponding to different types of identifiable values as defined above, for example by retaining certain pairs of values on the basis of an identifiable value pertaining to the magnitude, and, for other pairs of values, on the basis of an identifiable value pertaining to the electrical angular position.

The signature thus constructed is therefore a signature that makes it possible to index particular values representative of the intensity of the physical variable measured at particular positions expressed in incremented electrical angular position terms.

As seen above, the determination of the electrical signature of the sensor is done a first time during a phase of calibration of the sensor. During this calibration phase, the signature that is determined by computer is an electrical calibration signature. It is therefore indexed, as regards the incremented electrical angular position signature values, with respect to the original angular calibration phase shift $\theta m0\_cb$ resulting from the original choice for the calculation of the incremented electrical angular position during the calibration phase.

Note that the electrical calibration signature can be determined by computer by the detector itself, the computations needed for the determination of the signature then being carried out for example within the electronic control unit 28, including when it is integrated into a detector box as described above. However, if the calibration phase is done on a calibration bench, all or part of the determination of the electrical calibration signature of the sensor can be done by another electronic control unit, belonging to the calibration bench. It is also envisionable for the electrical calibration signature to be determined by an electronic control unit of the external system to which the detector is connected.

Once the electrical calibration signature has been determined, the electrical calibration signature of the target is recorded by computer. This recording can be made in an electronic memory integrated into the sensor, for example forming part of the electronic control unit 28, including when it is integrated into a detector box as described above. However, alternatively or additionally, this recording can be made in an electronic memory remote from the sensor, for example forming part of the external system to which the detector is connected.

The recording of the electrical calibration signature is made in such a way as to be able to recall the electrical calibration signature at each calibration phase of a large number of subsequent measurement sessions.

It is understood that the electrical calibration signature is intrinsically linked to an original angular calibration phase shift value $\theta m0\_cb$. This relationship results from the way in which the incremented electrical angular position signature value or values were determined.

When, in service, one wishes to implement the sensor to measure the mechanical angular position $\theta m$ of the rotor, by implementing an $i^{th}$ measurement session, this $i^{th}$ measurement session starts with a setting phase for this measurement session.

During this setting phase, the signature that is determined by computer is an electrical setting signature. It is therefore indexed, as regards the incremented electrical angular position signature values, with respect to the original angular setting phase shift $\theta m0\_i$ resulting from the original choice for the calculation of the incremented electrical angular position during this setting phase, and therefore valid for this $i^{th}$ measurement session.

Note that the electrical setting signature can be determined by computer by the detector 14 itself, the calculations needed to determine the signature then being carried out within the electronic control unit 28, particularly when it is integrated into a detector box as described above. It is also envisionable for the electrical setting signature be determined by an electronic control unit of the external system to which the detector is connected.

Once the electrical setting signature has been determined, one may choose to record by computer the electrical setting signature of the target, for example in an electronic memory integrated into the sensor, for example forming part of the electronic control unit 28 integrated into a detector box as described above, and/or in an electronic memory remote from the sensor, for example forming part of the external system to which the detector is connected.

In the setting phase, the electrical setting signature is reset with respect to the electrical calibration signature.

Specifically, since this concerns the same sensor, mounted in the same way on the rotor and on the stator, the magnitude signature values are assumed to be the same, to the nearest measurement uncertainty. On the other hand, the incremented electrical angular position signature values, each respectively associated with these magnitude signature values, are all angularly offset by the same angular measurement offset delta_i_$\theta m0$=($\theta m0\_i-\theta m0\_cb$).

If one has taken the precaution of taking, both for the calibration phase and for the setting phase, as the origin of the calculation of the incremented electrical angular position $\theta e\_inc$ an angular position for which the electrical angular position De takes a reference value, for example 0, this angular measurement offset corresponding to an integer number of angular extents of a contrast area, this gives delta_i_$\theta m0$=($\theta m0\_i-\theta m0\_cb$)=ki x 2Pi/Nc, such that the resetting operation is equivalent to the search for the number of ranks of offset ki.

The resetting operation is therefore equivalent to searching for the angular measurement offset delta_i_$\theta m0$= ($\theta m0\_i-\theta m0\_cb$), preferably by searching for the number of ranks of offset ki, which allows, by "rotation" of the electrical setting signature, this rotation being made of the value of the angular measurement offset, to find the electrical calibration signature again. This resetting operation is therefore the search for the angular measurement offset which makes it possible to angularly set the electrical calibration signature with the electrical setting signature. This is for example done by calculating the angular measurement offset which, applied to the incremented electrical angular position signature values of the electrical setting signature or of the electrical calibration signature, makes it possible to minimize the difference between the electrical setting signature and the electrical calibration signature.

By reasoning graphically with respect to the curves of variation of the function that is used as law of calculation of an instantaneous magnitude value representative of the intensity of the physical variable for the angular position under consideration, as in the example of FIGS. 6 and 7, this equates to finding the annular offset, here the number of electrical angular quasi-periods for which it is necessary to translate the curve acquired during the setting phase to superimpose it as well as possible onto the curve acquired during the calibration phase.

In the case where the signature can be written as an ordered vector of signature values, for example an ordered vector of magnitude signature values, for example SIG=Asig=(Asig1; Asig2; . . . ; AsigNc}, the resetting operation corresponds to determining the value of the number of increments of circular permutation that must be effected on the signature values of the ordered vector of the electrical setting signature to find the ordered vector of the electrical calibration signature again. This number of circular permutation increments gives the number of ranks of offset ki.

Note that, if one has taken the precaution of taking as origin of the calculation of the incremented electrical angular position $\theta e\_inc$ an angular position for which the electrical angular position $\theta e$ takes a reference value, for example 0, the determination of an angular measurement offset can be carried out with simple, quick calculations, and with the possibility of accepting high measurement uncertainties. Specifically, the number of possible solutions is limited to the number NC of contrast areas.

In practice, FIG. 11, illustrates, over 6 radar diagrams, the electrical calibration signature SIGcb and the electrical setting signature SIGi for one and the same sensor of the type for which the measurement signals and their derivatives are illustrated in FIGS. 7 to 10. One is therefore dealing with a sensor with 6 contrast areas. In each diagram, the electrical calibration signature SIGcb is illustrated in the form of a closed dotted-line curve and the electrical setting signature SIGi is illustrated in the form of a closed solid-line curve. The apices of the closed curve represent the pairs of signature values, in polar coordinates. In these diagrams, the angle between two immediately consecutive apices of the closed curve, with respect to the center of the diagram, is directly the image of the angular extent of one contrast area. The diagram A illustrates the two diagrams as resulting from the measurements. The diagrams B to F each correspond to a value of the number "n" of circular permutation increments applied to the electrical setting signature SIGi, which is also designated SIGi [n] in the diagrams B to F, with n the number of circular permutation increments. Note that the diagram E shows the two diagrams with the number of circular permutation increments that ensures the resetting of the signatures. It corresponds to 4 circular permutation increments in the clockwise direction, and therefore 2 circular permutation increments in the anti-clockwise direction. It will easily be deduced from this that, to reset the electrical setting signature in correspondence with the electrical calibration signature, it is necessary to offset the electrical setting signature by 4 times the angular extent of one contrast area in the clockwise direction, and therefore 2 times the angular extent of one contrast area in the anti-clockwise direction.

Mathematically, such a resetting can be carried out by determining, for each value of the number "n" of circular permutation increments, a distance, for example the "Manhattan distance" (FIG. 12) or the "Euclidian distance" (FIG. 13), between the ordered vectors representing the signatures. Other distances, such as the Minkowski distance or the Tchebychev distance may be used. Thus, for an electrical calibration signature which can be written in the form of an ordered vector $$SIGcb=Asigcb\{Asigcb_1;Asigcb_2;\ldots;Asigcb_{Nc}\}$$

and an electrical setting signature SIGi obtained for an "$i^{th}$" measurement session, which can also be written in the form of an ordered vector $$SIGi=Asigi\{Asigi_1;Asigi_2;\ldots;Asigi_{Nc}\},$$

the electrical calibration SIGcb and setting SIGi signatures then being each represented by the ordered vector formed by the Nc magnitude reference values, of calibration and setting respectively.

For each value of the number "n" of circular permutation increments, n varying from 1 to Nc, the electrical setting signature is transformed into an offset electrical setting signature:

$$SIGi[n]=\{Asigi_{1+n,\,within\,the\,range\,[1,Nc]};$$
$$Asigi_{2+n,\,within\,the\,range\,[1,Nc]};\ldots;;\ldots;$$
$$Asigi_{Nc+n,\,within\,the\,range\,[1,Nc]}\}$$

One can therefore, for each value of the number "n" of circular permutation increments, n varying from 1 to Nc, calculate the Euclidian distance DE(n):

$$DE(n) = \sqrt[2]{\sum_{j=1}^{j=Nc}(Asigi_{j+n,within\,the\,range[1,Nc]} - Asigcb_j)^2}.$$ [MATH 1]

Of course, since the square root function is an always increasing function, the same reasoning can be applied to the square of the distance, so without having to calculate the square root.

The value $n_{min}$ of the number of circular permutation increments for which the distance, whether it be the Manhattan distance, Euclidian distance, Minkowski or Tchebychev distance, is minimal, is the value whose electrical setting signature must be offset to be as close as possible to the electrical calibration signature.

This value $n_{min}$ gives the value ki which is the number of ranks of offset for the measurement session i with $$delta\_i\_\theta m0=(\theta m0\_i-\theta m0\_cb)=ki\times 2Pi/Nc$$

and ki=$n_{min}$ or ki=Nc−$n_{min}$ in the direction of rotation of the target.

In this way, during the $i^{th}$ measurement session, the mechanical angular position is given by the relationship $$\theta m=mod(\theta e\_inc+n_{min}\times 2Pi/Nc+\theta m0\_cb,2Pi)$$

To explain the principle of resetting by applying circular permutation to the electrical setting signatures, one may envision the case of a sensor for which one has acquired an electrical calibration signature having: a number M of pairs of reference values, with M>=Nc, and for which, for this electrical calibration signature, the different incremented electrical angular position signature values $\theta e\_inc\_sigcb_j$ are equidistant. In such a case, after determining an electrical setting signature for this same sensor, one can use the method of applying circular permutations to the ordered vector Asigi (Asigi1, Asigi2, . . . ) formed by the M setting magnitude reference values Asigi$_j$, and by comparing each circular permutation of the ordered vector Asigi to the ordered vector Asigcb {(Asigcb1; θe_inc_sigcb1); (Asigcb2; θe_inc_sigcb2), . . . } formed by the M calibration amplitude reference values Asigcb$_j$.

This method equates to calculating ki for example in the following way:

$$ki=round\{(Nc/M)\times arg\,min[1<=n<=M]D(Asigcb,C[n](Asigi))\}$$

Where:
"D" is an operator calculating any distance here between the ordered vectors Asigcb and C[n](Asigi), for example a distance from among one of the examples of distances given above;
"round" is the function rounding to the nearest integer;
the operator "arg min [1<=n<=M]" is the operator which, out of the integer values of the number "n", varying from 1 to M, returns the value of the number of increments for which the distance D (Asigcb, C[n](Asigi)) is minimal;
C[n] is an operator performing a circular permutation of "n" elements, which therefore effects a circular permutation on the components of the ordered vector (Acgi), and which can be mathematically defined by the following relationship:

$$C[n](X)=\{X\_mod(j+n,M)\}\text{ with }j\text{ ranging from 0 to }M-1.$$

If M is large, for example much greater than Nc, it can also be advisable not to apply the permutations method directly to the amplitude reference values. For example, if M is very large, it is potentially beneficial to compress the data beforehand. Such a compression consists in transforming any signature SIG={(Asig$_j$; θsig$_j$), with j ranging from 1 to M, into a signature of smaller size that will be denoted SIGcomp={(Asigcomp$_j$; θsigcomp$_j$), with j ranging from 1 to P}, where P is the size of the compressed signature (with P<M, and for example P>=Nc). Such a transformation can for example consist in taking the mean of the amplitude reference values Asig$_j$ over P angular segments. The same compression must be applied to the ordered vector Asigi formed by the M setting magnitude reference values Asigi$_j$, to obtain the compressed ordered vector Asigicomp, and to the ordered vector Asigcb formed by the M calibration magnitude reference values Asigcb$_j$, to obtain the compressed ordered vector Asigcbcomp. Next, it is enough to apply the permutations method to the P values of the vector thus formed, in the same way as previously described. With these new definitions, this would give:

$$ki=round\{(Nc/P)\times arg\,min[1<=n<=P]D(Asigcbcomp,C[n](Asigicomp))\}$$

Yet another way of calculating the angular measurement offset delta_i_θm0=(θm0_i−θm0_cb) is to employ Fourier transforms. Based on the electrical calibration signature SIGcb={(Asigcb$_j$;θe_inc_sigcb$_j$), with j ranging from 1 to M,}, the two following projections are calculated:

$$T\_sin\_cb=Sum(Asigcb_j\times\sin(\theta e\_inc\_sigcb_j)),\text{ for }j\text{ ranging from 1 to }M;$$

$$T\_cos\_cb=Sum(Asigcb_j\times\cos(\theta e\_inc\_sigcb_j)),\text{ for }j\text{ ranging from 1 to }M.$$

Next one calculates an equivalent phase beta_cb for the electrical calibration signature: beta_cb=atan2(T sin_cb, T cos_cb).

One proceeds in the same way for an electrical setting signature for the setting phase of an "$i^{th}$" measurement session, which supplies the electrical setting signature SIGi={(Asigi$_j$; θe_inc_sigi$_j$), ... }, with j ranging from 1 to M, the following two projections are calculated:

T sin_cgi=Sum(Asigi$_j$×sin(θe_inc_sigi$_j$)), for j ranging from 1 to M;

T cos_cgi=Sum(Asigi$_j$×cos(θe_inc_sigi$_j$)), for j ranging from 1 to M.

Next an equivalent phase beta_cgi is calculated for the electrical setting signature: beta_cgi=atan2(T sin_cgi, T cos_cgi).

This finally gives ki by performing the following calculation:

ki=round{(Nc/2Pi)(beta_cgi−beta_cbi)}, the round operator being the one that returns to the nearest integer.

Put very simply, the case may also be illustrated in which the electrical calibration signature is a signature which can be brought within the range of its ordered vector of the electrical angular position signature values:

SIGcb=θe_inc_sigcb={θe_inc_sigcb$_j$}, with j ranging from 1 to M}

For example SIGcb={17°, 88°, 112°, 130°, 310°}. Assuming the angular measurement offset value delta_i_θm0=172°, this gives an electrical calibration signature that will be written SIGi={122°, 189°, 260°, 184°, 302°}. By knowing SIGcb and SIGi, it will be easy to find the angular measurement offset value again, since it will be enough to find the value "n" of the number of circular permutations for which the difference (θe_inc_sigcb$_{j+n}$−θe_inc_sigcb$_j$) is a constant, this constant then being the angular measurement offset value. In this example, measurement noise is neglected. To take measurement noise into account it will be necessary to choose the value "n" of the number of circular permutations making it possible to obtain a minimum of dispersion.

According to another example, starting from the general case of an electrical calibration signature having M pairs of reference values and able to be written as SIGcb={(Asigcb1;θe_inc_sigcb1);(Asigcb2; θe_inc_sigcb2), ... ,(Asigcb$_M$;θe_inc_sigcb$_M$)} and an electrical setting signature, for a corresponding "$i^{th}$" measurement session, which can then be written SIGi={(Asigi1;θe_inc_sigi1);(Asigi2;θe_inc_sigi2-), ... ,(Asigi$_M$; θe_inc_sigi$_M$)}, one can first of all determine the value "$n_{min}$" of the number of circular permutations to be applied to the ordered vector Asigi={Asigi$_1$; Asigi$_2$; ... ; Asigi$_M$} that can be extracted from the electrical setting signature SIGi, for which the difference between the ordered vector:

Asigi[n]={Asigi$_{1+n,\ within\ the\ range\ [1,\ M]}$; Asigi$_{2+n,\ within\ the\ range\ [1,\ M]}$; ... ; Asigi$_{M+n,\ within\ the\ range\ [1,\ M]}$} and the ordered vector Asigcb {Asigcb$_1$; Asigcb$_2$; ... ; Asigcb$_M$}, extracted from SIGcb, is a minimum. This can for example be done as stated above by determining the value $n_{min}$ of the number of circular permutation increments for which the distance, whether it be the Manhattan distance, Euclidian distance, Minkowski or Tchebychev distance, is minimal. This value makes it possible to very simply find the value of the angular measurement offset again since it then gives, whatever the value of j:

delta_i_θm0=θe_inc_sigi$_{j+nmin,\ within\ the\ range\ [1,\ M]}$−θe_inc_sigcb$_j$ Moreover, to compensate for the inevitable measurement errors, it will be possible to take, as angular offset value, a mean value, for example a mean value of the angular offsets calculated according to this formula for several values of j, or even for all the values of j, or even for all the values of j varying from 1 to M−1.

It can be seen that the absolute position of the angular position of the rotor with respect to the stator depends on the original calibration angular phase shift value θm0_cb for the calibration phase. It is recalled that the original calibration angular phase shift value θm0_cb is the mechanical angular position of the rotor with respect to the stator for the original position of calculation of the incremented electrical angular position θe_inc for the calibration phase.

In certain applications, one does not need to know this original calibration phase shift value θm0_cb. In this case, it can then be given the arbitrary value 0, so that the mechanical angular position of the rotor with respect to the stator is then given by the relationship:

θm=mod(θe_inc+delta_i_θm0,2Pi)

which, in some of the examples described above is written

θm=mod(θe_inc+$n_{min}$×2Pi/Nc,2Pi)

In all cases, the mechanical angular position given by the sensor during the measurement session is a relative mechanical angular position which is a mechanical angular position unique over the 360 degrees of angle of rotation of the rotor with respect to the stator, but this position is given with respect to the original calibration phase shift value θm0_cb which is not known, but which still remains the same as long as the calibration is valid. If the relative mechanical angular position given by the sensor is used for example to drive a compensation law which is itself established as a function of the same original calibration phase shift value θm0_cb, this absence of knowledge of the original calibration phase shift value θm0_cb is not an impediment.

Note moreover that, if one does not know the original calibration phase shift value θm0_cb, but has taken care, during the calibration, to take as origin of the calculation of the incremented electrical angular position θe_inc an angular position for which the electrical angular position θe takes a reference value, for example 0, then one can use the relative mechanical angular position given by the sensor for example to drive a compensation law which has itself been established as a function of the periodic nature of the sensor. One may for example put oneself in this situation if the angular position value delivered by the sensor is used to drive an electric motor. In this case, provision may advantageously by made for a sensor which has the same number of contrast areas as the number of pairs of poles of the electric motor.

In other applications, one may wish to know this original angular phase shift value with respect to a given geometrical position, for example with respect to a frame of reference related to the stator, and thus have an absolute mechanical angular position. This can be done during the calibration using a calibration bench equipped with an absolute position sensor. In this case, one may, on the calibration bench, record the initial absolute mechanical position of the rotor with respect to the stator, in the form of a relative position between a reference frame of the rotor and a reference frame of the stator, for the original position of the calculation of the incremented electrical angular position θe_inc for the calibration phase. This initial absolute mechanical position is then used as the original angular phase shift value for the calibration. So, for any subsequent measurement session for which the same calibration remains valid, one will have the absolute mechanical angular position given by the relationship:

θm=mod(θe_inc+delta_i_θm0+θm0_cb,2Pi)

which, in some of the examples described above is written

θm=mod(θe_inc+$n_{min}$×2Pi/Nc+θm0_cb,2*pi)

The computations needed for the determination of the mechanical angular position are for example performed within the electronic control unit 28, particularly integrated into a detector box as described above. It is also envisionable for the mechanical angular position to be determined by an electronic control unit of the external system to which the detector is connected.

Of course, the mechanical angular position delivered by the sensor can undergo corrections and compensations, to improve its accuracy, for example on the basis of the mechanical angular position given by one of the methods indicated above. In particular, at the time of calibration one may define correction parameters to be applied to the mechanical angular position given by the methods above, for example as a function of the data of a calibration sensor available on the calibration bench. These corrections or compensations may be applied either to an absolute mechanical angular position given by the methods described above or to a relative mechanical angular position given by the methods described above.

What is claimed is:

1. A method for measuring the mechanical angular position (θm) of a rotor, the rotor being movable in multi-turn rotation about an axis of rotation (A1) with respect to a stator, the method comprising:
   acquiring a number Ns of electrical measurement signals (S1, S2) each representative of an intensity of an electrical or magnetic variable at one of a number Ns of measurement locations (P1, P2), the Ns measurement locations being separate, fixed with respect to the stator and offset by a given mechanical angle ("alpha") about the axis of rotation, Ns being an integer equal to 2 or 3;
   the variation in the electrical measurement signal at a measurement location is caused by the rotation, in front of the measurement location under consideration, of a target (12) mechanically linked to the rotor and having a number Nc, greater than or equal to 2, of separate contrast areas (Zk) of the target, in which the target includes a contrast in electrical conductivity, magnetic permeability and/or magnetization;
   the contrast areas (Zk) are angularly distributed across the target in a periodic pattern about the axis of rotation, the pattern having Nc pattern quasi-periods, each contrast area extending over a mechanical angle of 2Pi/Nc about the axis of rotation;
   each contrast area (Zk) is such that the passing, in rotation about the axis of rotation, of a contrast area in front of each measurement location induces a variation in the electrical measurement signal (S1, S2) acquired at this location which is a quasi-sinusoidal function of an electrical angular position (θe) of the contrast area with respect to the measurement location, the electrical angular position (θe) varying by 2Pi radians for a 2Pi/Nc radians variation in the mechanical angular position (θm) of the target about the axis of rotation;
   at least two of the contrast areas Zk have a physical difference between one another which creates, between at least two separate quasi-periods of the measurement signal, over one and the same turn of the target, a difference in the amplitude of the intensity of the physical variable measured in said at least two separate quasi-periods of the measurement signal respectively;
   wherein the measurement locations are offset about the axis of rotation by a corresponding mechanical angle (alpha), modulo 2Pi/Nc radians of angle, to Pi/(2×Nc) radians for Ns=2 and 2Pi/3Nc radians for Ns=3; and
   wherein the method includes, during a calibration phase, then again during a setting phase of a measurement session:
   a) acquiring, over one mechanical turn of the target about the axis of rotation, the Ns electrical measurement signals (S1, S2);
   b) computing, for different mechanical angular positions over one mechanical turn of the target about the axis of rotation, an instantaneous value of the electrical angular position (θe) for the mechanical angular position under consideration, by a law of calculation of the electrical angular position taking into account:
   for Ns=2, the arctangent of the ratio of the values of the two measurement signals (S1, S2) for the time under consideration, or
   for Ns=3, the arctangent of the ratio of the values of the two transforms obtained by a Clarke transform, applied to the three measurement signals for the time under consideration;
   c) computing an instantaneous incremented electrical angular position value (θe_inc), obtained by incrementing a counter X by one unit for any 2PI radians variation in the electrical angular position (θe), this variation occurring in the same direction of rotation;
   d) determining by a computer at least one electrical signature of the target, comprising an electrical calibration signature determined during the calibration phase and an electrical setting signature determined during the setting phase, each electrical signature being determined by a pair of signature values or a series of pairs of signature values, a pair of signature values comprising:
   a magnitude signature value, derived from at least one of the values of at least one of the measurement signals for at least one angular position of the target; and
   an angular position signature value for the angular position or positions of the target corresponding to the instantaneous magnitude value or values that were taken into account to determine the magnitude signature value;
   wherein, during the calibration phase, the electrical calibration signature of the target is recorded by a computer;
   wherein, during the setting phase of a measurement session, an angular offset measurement value (delta_i_θm0) is determined by a resetting operation comprising the calculation of the angular measurement offset value, which, applied to the angular position signature values of the electrical setting signature or of the electrical calibration signature, makes it possible to minimize the difference between the electrical setting signature and the electrical calibration signature; and wherein, during the measurement session, the mechanical angular position (θm) of the rotor at a given time is determined by correcting the incremented electrical angular position by an amount equal to the angular measurement offset value, and wherein the electrical measurement signal is a voltage, a current, or a magnetic field, and wherein the electrical or magnetic quantity is a voltage, a current, or a magnetic field.

2. The method as claimed in claim 1, wherein the instantaneous incremented electrical angular position value (θe_inc) is obtained according to the relationship:

$$\theta e\_inc = \mathrm{mod}((\theta e + X \times 2Pi)/Nc, 2Pi)$$

and, comprising determining the mechanical angular position (θm) of the rotor at a given time as being, modulo 2Pi, the incremented electrical angular position (θe_inc) corrected by an amount equal to the angular measurement offset value.

3. The method as claimed in claim 1, wherein the instantaneous incremented electrical angular position value (θe_inc), is obtained according to the relationship:

$$\theta e\_inc = \mathrm{mod}((\theta e + X \times 2Pi), Nc \times 2Pi)$$

and comprising determining the mechanical angular position (θm) of the rotor at a given time as being, modulo 2Pi, the incremented electrical angular position (θe_inc), divided by the number of contrast areas and corrected by an amount equal to the angular measurement offset value.

4. The method as claimed in claim 1, wherein the determination of a pair of signature values of an electrical signature comprises:

i) computing, at each angular position over one mechanical turn of the rotor about the axis of rotation:

an instantaneous magnitude value representative of the intensity of the physical variable for the angular position, by a law of calculation of the instantaneous magnitude values taking into account the value of at least one of the two measurement signals for the time under consideration;

an instantaneous electrical angular position value, by the law of calculation of the instantaneous electrical angular position values;

ii) recording by a computer the pair of signature values comprising, according to a rule of determination of signature values:

the magnitude signature value, derived from at least one of the instantaneous magnitude values;

and the incremented electrical angular position signature value derived from the instantaneous electrical angular position values for the angular position or positions, the instantaneous magnitude value or values of which were taken into account to derive the magnitude signature value.

5. The method as claimed in claim 4, wherein the rule of determination of signature values takes into account, for a given angular position, at least one value from among:

the sum of the squares of the measurement signal values for this angular position, each measurement signal value being able to be reduced by an offset value of this signal, or the square root of this sum;

a linear combination of the squares of the measurement signal values for this angular position, each measurement signal value being able to be reduced by an offset value of this signal, or the square root of this linear combination;

a linear combination of the absolute measurement signal values for this angular position, each measurement signal value being able to be reduced by an offset value of this signal;

the sum or a linear combination of the measurement signal values for this angular position, each measurement signal value being able to be reduced by an offset value of this signal.

6. The method as claimed in claim 4, wherein that the rule of determination of signature values takes into account, for an angular range, for example one sinusoidal quasi-period of a measurement signal, at least one value from among:

a maximum value of the absolute value of one or more of the measurement signals over this angular range, each measurement signal value being able to be reduced by an offset value of this signal;

a mean value of one or more measurement signals over this angular range, each measurement signal value being able to be reduced by an offset value of this signal.

7. The method as claimed in claim 4, wherein that the rule of determination of signature values takes into account, for an angular range, for example one sinusoidal quasi-period of a measurement signal, at least one value from among:

a mean value, over this angular range, of the square root of the sum of the squares of the measurement signal values, each measurement signal value being able to be reduced by an offset value of this signal;

a mean value, over this angular range, of the square root of a linear combination of the squares of the measurement signal values, each measurement signal value being able to be reduced by an offset value of this signal;

a mean value, over this angular range, of a linear combination of the absolute measurement signal values, each measurement signal value being able to be reduced by an offset value of this signal.

8. The method as claimed in claim 4, wherein the rule of determination of signature values determines at least one pair of signature values corresponding to an identifiable value from among the pairs of values formed by an instantaneous magnitude value and by the corresponding incremented electrical angular position.

9. The method as claimed in claim 8, wherein the identifiable value is an instantaneous magnitude value which takes one from among the following values: local maximum, local maximum over one quasi-period of the electrical angular position, local minimum, local minimum over one quasi-period of the electrical angular position, absolute maximum over one mechanical turn of the target, absolute maximum over one quasi-period of the electrical angular position, absolute minimum over one mechanical turn of the target, absolute minimum over one quasi-period of the electrical angular position, previously determined value, mean value over one mechanical turn of the target, mean value over one quasi-period of the electrical angular position, and mean value over one half-period of the electrical angular position.

10. The method as claimed in claim 8, wherein the identifiable value is an electrical angular position or an incremented electrical angular position.

11. The method as claimed in claim 4, wherein the rule of determination of signature values determines at least one pair of signature values corresponding to one or more predefined values of electrical angular position (θe) and/or to a predefined series of incremented electrical angular positions (θe_inc).

12. The method as claimed in claim 1, wherein the electrical signature of the target comprises at least one pair of signature values having a magnitude signature value, the value of which is unique over one mechanical turn.

13. The method as claimed in claim 1, wherein the electrical signature of the target comprises at least one pair of signature values having a magnitude signature value, the value of which exhibits the greatest difference from all the other instantaneous magnitude values corresponding to the same instantaneous value of the electrical angle over one mechanical turn.

14. The method as claimed in claim 1, wherein the electrical signature of the target comprises an ordered series of pairs of signature values, each pair of signature values corresponding to one contrast area.

15. The method as claimed in claim 14, wherein the series of pairs of signature values is ordered according to the order in which the corresponding contrast areas Zk pass in front of each measurement location.

16. The method as claimed in claim 1, wherein, starting from an electrical calibration signature having M pairs of reference values and able to be written as $$SIGcb=\{(Asigcb1;\theta e\_inc\_sigcb1);(Asigcb2;\theta e\_inc\_sigcb2),\ldots,(Asigcb_M;\theta e\_inc\_sigcb_M)\}$$

and an electrical setting signature, written as $$SIGi=\{(Asigi1;\theta e\_inc\_sigi1);(Asigi2;\theta e\_inc\_sigi2-),\ldots,(Asigi_M;\theta e\_inc\_sigi_M)\},$$

one computes the value "$n_{min}$" of the number of circular permutations to be applied to the ordered vector of magnitude signature values $Asigi=\{Asigi_1; Asigi_2; \ldots ; Asigi_M\}$ extracted from the electrical setting signature SIGi, for which the difference between the circularly permutated ordered vector is:

$$Asigi[n]=\{Asigi_{1+n,\ within\ the\ range\ [1,M]};\ Asigi_{2+n,\ within\ the\ range\ [1,M]};\ \ldots;\ Asigi_{M+n,\ within\ the\ range\ [1,M]}\}$$

and the ordered vector of magnitude signature values Asigcb $\{Asigcb_1; Asigcb_2; \ldots ; Asigcb_M\}$, extracted from the electrical calibration signature SIGcb, is minimal, and in that one can compute the value of this angular measurement offset from the difference, for at least one value of j:

$$delta\_i\_\theta m0=\theta e\_inc\_sigi_{j+nmin,\ within\ the\ range\ [1,M]}-\theta e\_inc\_sigcb_j.$$

17. The method as claimed in claim 1, wherein the physical difference between two of the contrast areas Zk is a voluntary difference in design of a sensor comprising the target and the means for acquiring the Ns electrical measurement signals (S1, S2).

18. The method as claimed in claim 1, wherein the physical difference between two of the contrast areas Zk is an involuntary difference related to manufacturing or installation dispersions of a sensor comprising the target and the means for acquiring the Ns electrical measurement signals (S1, S2).

19. A device for measuring the mechanical angular position (θm) of a rotor, the rotor being movable in multi-turn rotation about an axis of rotation (A1) with respect to a stator, including:

a detector (14) that acquires a number Ns of electrical measurement signals (S1, S2) each representative of an intensity of an electrical or magnetic variable at one of a number Ns of measurement locations (P1, P2), the Ns measurement locations being separate, fixed with respect to the stator and offset by a given mechanical angle ("alpha") about the axis of rotation, Ns being an integer equal to 2 or 3;

a target (12) mechanically linked to the rotor and having a number Nc, greater than or equal to 2, of separate contrast areas (Zk) of the target, in which the target includes a contrast in electrical conductivity, magnetic permeability and/or magnetization;

the contrast areas (Zk) are angularly distributed across the target in a periodic pattern about the axis of rotation, the pattern having Nc pattern quasi-periods, each contrast area extending over a mechanical angle of 2Pi/Nc about the axis of rotation;

each contrast area (Zk) is such that the passing, in rotation about the axis of rotation, of a contrast area of the target in front of each measurement location induces a variation in the electrical measurement signal (S1, S2) acquired at this location which is a quasi-sinusoidal function of an electrical angular position (θe) of the contrast area with respect to the measurement location, the electrical angular position (θe) varying by 2Pi radians for a 2Pi/Nc radians variation in the mechanical angular position (θm) of the target about the axis of rotation;

at least two of the contrast areas Zk have a physical difference between one another which creates, between at least two separate quasi-periods of the measurement signal over one and the same turn of the target, a difference in the amplitude of the intensity of the physical variable measured in said at least two separate quasi-periods of the measurement signal respectively;

wherein the measurement locations are offset about the axis of rotation by a corresponding mechanical angle (alpha), modulo 2Pi/Nc radians of angle, to Pi/(2×Nc) radians for Ns=2 and 2Pi/3Nc radians for Ns=3, and wherein the device includes an electronic control unit (28) programmed to:

a) acquire, over one mechanical turn of the target about the axis of rotation, the Ns electrical measurement signals (S1, S2), b) compute, for different mechanical angular positions over one mechanical turn of the target about the axis of rotation, an instantaneous value of the electrical angular position (θe) for the mechanical angular position under consideration, by a law of calculation of the electrical angular position taking into account for Ns=2, the arctangent of the ratio of the values of the two measurement signals (S1, S2) for the time under consideration, or for Ns=3, the arctangent of the ratio of the values of the two transforms obtained by a Clarke transform, applied to the three measurement signals for the time under consideration;

c) compute an instantaneous incremented electrical angular position value (θe_inc), obtained by incrementing a counter X by one unit for any 2PI radians variation in the electrical angular position (θe), this variation occurring in the same direction of rotation;

d) determine by a computer at least one electrical signature of the target, each electrical signature being determined by a pair of signature values or a series of pairs of signature values, a pair of signature values comprising:

a magnitude signature value, derived from at least one of the values of at least one of the measurement signals for at least one angular position of the target; and an angular position signature value for the angular position or positions of the target corresponding to the instantaneous magnitude value or values that were taken into account to determine the magnitude signature value;

wherein, the device includes an electronic memory in which is recorded by a computer an electrical calibration signature of the target determined during a calibration phase;

wherein, the electronic control unit (28) is programmed to, during a setting phase of a measurement session, determine an electrical setting signature and an angular measurement offset value (delta_i_θm0) by a resetting operation comprising the calculation of the angular measurement offset value which, applied to the angular position signature values of the electrical setting signature or of the electrical calibration signature, makes it possible to minimize the difference between the electrical setting signature and the electrical calibration signature; and wherein, during the measurement session, the electronic control unit determines the mechanical angular position (θm) of the rotor at a given time by correcting the incremented electrical angular position by an amount equal to the angular measurement offset value, and wherein the electrical measurement signal is a voltage a current, or a magnetic field, and wherein the electrical or magnetic quantity is a voltage, a current, or a magnetic field.

20. The device as claimed in claim 19, wherein the electronic control unit (28) is programmed to, during a calibration phase;
a) acquire, over one mechanical turn of the target about the axis of rotation, the Ns electrical measurement signals (S1, S2),
b) compute, for different mechanical angular positions over one mechanical turn of the target about the axis of rotation, an instantaneous value of the electrical angular position (θe) for the mechanical angular position under consideration, by a law of calculation of the electrical angular position taking into account
for Ns=2, the arctangent of the ratio of the values of the two measurement signals (S1, S2) for the time under consideration, or
for Ns=3, the arctangent of the ratio of the values of the two transforms obtained by a Clarke transform, applied to the three measurement signals for the time under consideration;
c) compute an instantaneous incremented electrical angular position value (θe_inc), obtained by incrementing a counter X by one unit for any 2PI radians variation in the electrical angular position (θe), this variation occurring in the same direction of rotation;
d) determine by a computer at least one electrical calibration signature of the target, determined by a pair of signature values or a series of pairs of signature values, a pair of signature values comprising:
a magnitude signature value, derived from at least one of the values of at least one of the measurement signals for at least one angular position of the target; and
an angular position signature value for the angular position or positions of the target corresponding to the instantaneous magnitude value or values that were taken into account to determine the magnitude signature value.

21. The device as claimed in claim 19, wherein the physical difference between two of the contrast areas Zk is a voluntary difference in design of the target (12).

22. The device as claimed in claim 19, wherein the physical difference between two of the contrast areas Zk is an involuntary difference related to manufacturing or installation dispersions of a sensor comprising the target and the detector (14).

23. The device as claimed in claim 19, wherein the electronic control unit (28) is programmed to implement a method for measuring the mechanical angular position (θm) of a rotor, the rotor being movable in multi-turn rotation about an axis of rotation (A1) with respect to a stator, of the type in which:
one acquires a number Ns of electrical measurement signals (S1, S2) each representative of the intensity of an electrical or magnetic variable at one of a number Ns of measurement locations (P1, P2), the Ns measurement locations being separate, fixed with respect to the stator and offset by a given mechanical angle ("alpha") about the axis of rotation, Ns being an integer equal to 2 or 3;
the variation in the electrical measurement signal at a measurement location is caused by the rotation, in front of the measurement location under consideration, of a target (12) mechanically linked to the rotor and having a number Nc, greater than or equal to 2, of separate contrast areas (Zk) of the target, in which the target includes a contrast in electrical conductivity, magnetic permeability and/or magnetization;
the contrast areas (Zk) are angularly distributed across the target in a periodic pattern about the axis of rotation, the pattern having Nc pattern quasi-periods, each contrast area extending over a mechanical angle of 2Pi/Nc about the axis of rotation;
each contrast area (Zk) is such that the passing, in rotation about the axis of rotation, of a contrast area in front of each measurement location induces a variation in the electrical measurement signal (S1, S2) acquired at this location which is a quasi-sinusoidal function of an electrical angular position (θe) of the contrast area with respect to the measurement location, the electrical angular position (θe) varying by 2Pi radians for a 2Pi/Nc radians variation in the mechanical angular position (θm) of the target about the axis of rotation;
at least two of the contrast areas Zk have a physical difference between one another which creates, between at least two separate quasi-periods of the measurement signal, over one and the same turn of the target, a difference in the amplitude of the intensity of the physical variable measured in said at least two separate quasi-periods of the measurement signal respectively;
wherein the measurement locations are offset about the axis of rotation by a corresponding mechanical angle (alpha), modulo 2Pi/Nc radians of angle, to Pi/(2×Nc) radians for Ns=2 and 2Pi/3Nc radians for Ns=3;
and in that the method includes, during a calibration phase, then again during a setting phase of a measurement session:
a) acquiring, over one mechanical turn of the target about the axis of rotation, the Ns electrical measurement signals (S1, S2);
b) computing, for different mechanical angular positions over one mechanical turn of the target about the axis of rotation, an instantaneous value of the electrical angular position (e) for the mechanical angular position under consideration, by a law of calculation of the electrical angular position taking into account:

for Ns=2, the arctangent of the ratio of the values of the two measurement signals (S1, S2) for the time under consideration, or for Ns=3, the arctangent of the ratio of the values of the two transforms obtained by a Clarke transform, applied to the three measurement signals for the time under consideration;

c) computing an instantaneous incremented electrical angular position value (θe_inc), obtained by incrementing a counter X by one unit for any 2PI radians variation in the electrical angular position (θe), this variation occurring in the same direction of rotation;

d) determining by a computer at least one electrical signature of the target, comprising an electrical calibration signature determined during the calibration phase and an electrical setting signature determined during the setting phase, each electrical signature being determined by a pair of signature values or a series of pairs of signature values, a pair of signature values comprising:

a magnitude signature value, derived from at least one of the values of at least one of the measurement signals for at least one angular position of the target; and an angular position signature value for the angular position or positions of the target corresponding to the instantaneous magnitude value or values that were taken into account to determine the magnitude signature value;

in that, during the calibration phase, the electrical calibration signature of the target is recorded by a computer;

wherein, during the setting phase of a measurement session, one determines an angular offset measurement value (delta_i_θm0) by a resetting operation comprising the calculation of the angular measurement offset value, which, applied to the angular position signature values of the electrical setting signature or of the electrical calibration signature, makes it possible to minimize the difference between the electrical setting signature and the electrical calibration signature; and wherein, during the measurement session, one determines the mechanical angular position (θm) of the rotor at a given time by correcting the incremented electrical angular position by an amount equal to the angular measurement offset value.

24. The device as claimed in claim 19, wherein the detector (14) is produced in the form of a detector box, comprising a box, preferably sealed, in which are arranged measuring cells (B1, B2), the electronic control unit (28) and a computerized communication interface.

* * * * *